US009554268B2

(12) United States Patent
Rajaram et al.

(10) Patent No.: US 9,554,268 B2
(45) Date of Patent: Jan. 24, 2017

(54) SYSTEM AND METHOD FOR UPDATING PERSISTENT DATA IN A WIRELESS COMMUNICATIONS DEVICE

(75) Inventors: Gowri Rajaram, San Diego, CA (US); Gregory Lie, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 1940 days.

(21) Appl. No.: 09/972,519

(22) Filed: Oct. 5, 2001

(65) Prior Publication Data

US 2003/0069007 A1    Apr. 10, 2003

Related U.S. Application Data

(63) Continuation-in-part of application No. 09/916,460, filed on Jul. 26, 2001, now Pat. No. 7,159,214, and a
(Continued)

(51) Int. Cl.
*H04W 8/24* (2009.01)
*G06F 9/445* (2006.01)
(Continued)

(52) U.S. Cl.
CPC ............. *H04W 8/245* (2013.01); *G06F 8/65* (2013.01); *H04M 1/72525* (2013.01);
(Continued)

(58) Field of Classification Search
CPC .............. H04W 8/245; H04M 1/72525; H04M 3/42178; H04M 2207/18; H04M 2250/02; G06F 8/65
(Continued)

(56) References Cited

U.S. PATENT DOCUMENTS 5,046,082 A    9/1991   Zicker et al.
5,337,255 A    8/1994   Seidel et al.
(Continued)

FOREIGN PATENT DOCUMENTS

DE    19502728    8/1996
DE    19543843    5/1997
(Continued)

OTHER PUBLICATIONS

International Search Report (ISR): PCT/ISA/210 for International Application No. PCT/IB02/02890, ISR dated Oct. 28, 2003, 4 pages.
(Continued)

*Primary Examiner* — Marcos Torres

(57) ABSTRACT

A system and method are provided for updating persistent data in a wireless communications device. The wireless communications device receives patch manager run time instructions from an airlink interface. A run-time engine is launched. The run-time engine receives the patch manager run time instructions with dynamic instruction sets and new code sections, including updated persistent data. The run-time engine processes the dynamic instruction sets. In response to processing the dynamic instruction sets, the run-time engine selectively updates persistent data in the system software. The updated persistent data may, for example, be selected from the following: radio frequency (RF) calibration data, nonvolatile system and user configuration data, resource data, nonvolatile system and user application data, and arbitrary data.

40 Claims, 25 Drawing Sheets

Related U.S. Application Data continuation-in-part of application No. 09/916,900, filed on Jul. 26, 2001, now Pat. No. 7,027,806, and a continuation-in-part of application No. 09/917,026, filed on Jul. 26, 2001, now Pat. No. 7,328,007.

(51) Int. Cl.
   *H04M 1/725* (2006.01)
   *H04M 3/42* (2006.01)

(52) U.S. Cl.
   CPC .... *H04M 3/42178* (2013.01); *H04M 2207/18* (2013.01); *H04M 2250/02* (2013.01)

(58) Field of Classification Search
   USPC ....... 455/418–419, 550.1, 558; 717/168–178
   See application file for complete search history.

(56) References Cited

U.S. PATENT DOCUMENTS

| | | | |
|---|---|---|---|
| 5,400,389 A | | 3/1995 | Niiyama et al. |
| 5,481,706 A | | 1/1996 | Peek |
| 5,507,009 A | | 4/1996 | Grube et al. |
| 5,600,823 A | | 2/1997 | Sherer et al. |
| 5,673,317 A | | 9/1997 | Cooper |
| 5,699,275 A | | 12/1997 | Beasley et al. |
| 5,715,462 A | | 2/1998 | Iwamoto et al. |
| 5,734,904 A | | 3/1998 | Kanamori et al. |
| 5,771,386 A | | 6/1998 | Baumbauer |
| 5,784,537 A | | 7/1998 | Suzuki et al. |
| 5,790,704 A | | 8/1998 | Rao et al. |
| 5,790,856 A | | 8/1998 | Lillich |
| 5,832,086 A * | | 11/1998 | Rosauer ............... 380/273 |
| 5,835,778 A | | 11/1998 | Yoshihara |
| 5,875,242 A | | 2/1999 | Glaser et al. |
| 5,920,826 A * | | 7/1999 | Metso et al. ............. 455/557 |
| 5,930,704 A | | 7/1999 | Kay |
| 5,938,766 A | | 8/1999 | Anderson et al. |
| 5,960,356 A * | | 9/1999 | Alperovich et al. ........ 455/458 |
| 5,974,312 A * | | 10/1999 | Hayes et al. ............. 455/419 |
| 6,018,543 A * | | 1/2000 | Blois et al. ............. 375/133 |
| 6,023,620 A | | 2/2000 | Hansson |
| 6,026,400 A | | 2/2000 | Suzuki |
| 6,047,071 A | | 4/2000 | Shah |
| 6,052,600 A * | | 4/2000 | Fette et al. ............. 455/509 |
| 6,138,009 A | | 10/2000 | Birgerson |
| 6,138,153 A | | 10/2000 | Collins et al. |
| 6,145,098 A | | 11/2000 | Nouri et al. |
| 6,195,546 B1 | | 2/2001 | Leung et al. |
| 6,247,065 B1 | | 6/2001 | Greenspan et al. |
| 6,272,333 B1 | | 8/2001 | Smith |
| 6,275,694 B1 | | 8/2001 | Yoshida et al. |
| 6,308,061 B1 | | 10/2001 | Criss et al. |
| 6,351,636 B2 | | 2/2002 | Shaffer et al. |
| 6,415,266 B1 | | 7/2002 | Do |
| 6,442,660 B1 | | 8/2002 | Heneriau et al. |
| 6,449,476 B1 | | 9/2002 | Hutchison, IV et al. |
| 6,457,174 B1 | | 9/2002 | Kuroda et al. |
| 6,460,070 B1 | | 10/2002 | Turek et al. |
| 6,470,447 B1 | | 10/2002 | Lambert et al. |
| 6,493,549 B1 | | 12/2002 | Axelson et al. |
| 6,493,871 B1 | | 12/2002 | McGuire et al. |
| 6,498,789 B1 | | 12/2002 | Honda |
| 6,546,492 B1 | | 4/2003 | Walker et al. |
| 6,549,770 B1 | | 4/2003 | Marran |
| 6,578,056 B1 | | 6/2003 | Lamburt |
| 6,578,142 B1 | | 6/2003 | Anderson et al. |
| 6,622,017 B1 * | | 9/2003 | Hoffman ............... 455/419 |
| 6,633,759 B1 * | | 10/2003 | Kobayashi ............. 455/419 |
| 6,643,506 B1 | | 11/2003 | Criss et al. |
| 6,714,992 B1 | | 3/2004 | Kanojia et al. |
| 6,731,946 B1 | | 5/2004 | Stanwood et al. |
| 6,754,894 B1 | | 6/2004 | Costello et al. |
| 6,754,895 B1 | | 6/2004 | Bartel et al. |
| 6,763,252 B2 | | 7/2004 | Itazawa |
| 6,785,541 B2 | | 8/2004 | Martin |
| 6,950,847 B2 | | 9/2005 | Harrisville-Wolff et al. |
| 6,959,192 B1 | | 10/2005 | Cannon et al. |
| 6,990,660 B2 | | 1/2006 | Moshir et al. |
| 7,065,347 B1 | | 6/2006 | Vikse et al. |
| 2001/0000538 A1 | | 4/2001 | Kowaguchi |
| 2001/0005861 A1 | | 6/2001 | Mousseau et al. |
| 2001/0019953 A1 | | 9/2001 | Furukawa et al. |
| 2001/0027500 A1 | | 10/2001 | Matsunaga |
| 2001/0051519 A1 | | 12/2001 | Shirai |
| 2001/0054161 A1 | | 12/2001 | Wooddruff |
| 2002/0019973 A1 | | 2/2002 | Hayashida |
| 2002/0026634 A1 * | | 2/2002 | Shaw ............... 717/173 |
| 2002/0065041 A1 * | | 5/2002 | Lunsford et al. ............. 455/41 |
| 2002/0065959 A1 * | | 5/2002 | Kim et al. ............... 710/1 |
| 2002/0072359 A1 | | 6/2002 | Moles et al. |
| 2002/0077077 A1 | | 6/2002 | Rezvani et al. |
| 2002/0083142 A1 | | 6/2002 | Lagosanto et al. |
| 2002/0083143 A1 | | 6/2002 | Cheng |
| 2002/0131397 A1 | | 9/2002 | Patel et al. |
| 2002/0142762 A1 | | 10/2002 | Chmaytelli et al. |
| 2002/0152268 A1 | | 10/2002 | Kureshy et al. |
| 2002/0160763 A1 | | 10/2002 | Mittal et al. |
| 2002/0161796 A1 | | 10/2002 | Sylthe |
| 2002/0170039 A1 | | 11/2002 | Kovacevic |
| 2003/0014561 A1 | | 1/2003 | Cooper |
| 2003/0060189 A1 | | 3/2003 | Minear et al. |
| 2003/0195013 A1 | | 10/2003 | Zicker et al. |
| 2004/0158829 A1 | | 8/2004 | Beresin et al. |
| 2004/0177072 A1 | | 9/2004 | Salminen et al. |
| 2004/0203768 A1 | | 10/2004 | Ylitalo et al. |
| 2004/0214551 A1 | | 10/2004 | Kim |
| 2004/0229644 A1 | | 11/2004 | Heie et al. |
| 2004/0240657 A1 | | 12/2004 | Camarillo |
| 2004/0249657 A1 | | 12/2004 | Kol et al. |
| 2004/0249768 A1 | | 12/2004 | Kontio et al. |
| 2004/0266422 A1 | | 12/2004 | Hotze et al. |
| 2005/0064847 A1 | | 3/2005 | Kirbas et al. |
| 2005/0079863 A1 | | 4/2005 | Macaluso |
| 2005/0209930 A1 | | 9/2005 | Coppinger et al. |

FOREIGN PATENT DOCUMENTS

| | | |
|---|---|---|
| DE | 19850133 | 5/1999 |
| EP | 0459344 | 12/1991 |
| EP | 0889405 | 1/1999 |
| EP | 0918420 | 5/1999 |
| EP | 1014263 | 6/2000 |
| FR | 2800963 | 5/2001 |
| GB | 2227584 | 8/1990 |
| GB | 2349485 | 11/2000 |
| WO | WO 9300633 | 1/1993 |
| WO | WO 96/32679 | 10/1996 |
| WO | WO 98/09208 | 3/1998 |
| WO | WO 98/58506 | 12/1998 |
| WO | WO 9922325 | 5/1999 |
| WO | WO 0067112 | 11/2000 |
| WO | WO 0073912 | 12/2000 |
| WO | WO 0074412 | 12/2000 |
| WO | WO 0135686 | 5/2001 |
| WO | WO 02058364 | 7/2002 |

OTHER PUBLICATIONS

Guiagoussou et al., "Implementation of a Diagnostic and Troubleshooting Multi-Agent System for Cellular Networks", Int'l J Network Mgmnt., pp. 221-237, Aug. 1999.

European Search Report (ESR) for European Patent Application No. EP05021081, ESR dated Jan. 1, 2007, 7 pages.

\* cited by examiner

326

| CODE SECTION ADDRESS TABLE | |
|---|---|
| IDENTIFIERS | ADDRESSES |
| CS_1 | START ADDRESS 1 (00100) |
| CS_2 | START ADDRESS 2 (00200) |
| ⋮ | ⋮ |
| CS_N | START ADDRESS N (00700) |
| PM | START ADDRESS P (01000) |

FIG. 5

|   | 0 | 1 | 2 | 3 | 4 | 5 | 6 | 7 |
|---|---|---|---|---|---|---|---|---|
| 0 |   |   |   | X |   |   |   |   |
| 1 |   |   |   |   |   | Y |   |   |
| ⋮ |   |   |   |   |   |   |   |   |
| n |   |   |   |   | Z |   |   |   |

SYMBOL LIBRARY 1

| SYMBOL OFFSET ADDRESS TABLE |||
|---|---|---|
| SYMBOL ID | CODE SECTION ID | OFFSET |
| X_1 | CS_1 | 03 |
| Y_1 | CS_1 | 15 |
| P_1 | CS_2 | 11 |
| Q_1 | CS_2 | 33 |
| AA_3 | CS_2 | 47 |
| ⋮ | | |

SYSTEM AND METHOD FOR UPDATING PERSISTENT DATA IN A WIRELESS COMMUNICATIONS DEVICE

RELATED APPLICATIONS

This application is a continuation-in-part of U.S. application Ser. No. 09/916,460, filed Jul. 26, 2001 now U.S. Pat. No. 7,159,214 and incorporated herein by reference; of U.S. application Ser. No. 09/916,900, filed Jul. 26, 2001, now U.S. Pat. No. 7,027,806 and incorporated herein by reference; and of U.S. application Ser. No. 09/917,026 now U.S. Pat. No. 7,328,007. In addition, this application is related to U.S. application Ser. No. 09/927,131, filed on Aug. 10, 2001 and is incorporated herein by reference to U.S. application Ser. No. 09/969,305, filed on Oct. 2, 2001; and to U.S. application Ser. No. 09/970,188, filed on Oct. 3, 2001.

BACKGROUND OF THE INVENTION

1. Field of the Invention

This invention generally relates to wireless communications devices and, more particularly, to a system and method for using dynamic instructions sets to update persistent data items in the system software of wireless communications devices.

2. Description of the Related Art

It is not uncommon to release software updates for phones that are already in the field. These updates may relate to problems found in the software once the phones have been manufactured and distributed to the public. Some updates may involve the use of new features on the phone, or services provided by the service provider. Yet other updates may involve regional problems, or problems associated with certain carriers. For example, in certain regions the network layout of carriers may impose airlink interface conditions on the handset that cause the handset to demonstrate unexpected behavior such as improper channel searching, improper call termination, improper audio, or the like.

The traditional approach to such updates has been to recall the wireless communications device, also referred to herein as a wireless device, phone, telephone, or handset, to the nearest carrier retail/service outlet, or to the manufacturer to process the changes. The costs involved in such updates are extensive and eat into the bottom line. Further, the customer is inconvenienced and likely to be irritated. Often times, the practical solution is to issue the customer new phones.

The wireless devices are used in a number of environments, with different subscriber services, for a number of different customer applications. Therefore, even if the software of a wireless device can be upgraded to improve service, it is unlikely that the upgrade will provide a uniform improvement for all users.

It would be advantageous if wireless communications device software could be upgraded cheaply, and without inconvenience to the customer.

It would be advantageous if wireless communications device software could be upgraded without the customer losing the use of their phones for a significant period of time.

It would be advantageous if wireless communications device software could be updated with a minimum of technician service time, or without the need to send the device into a service facility.

It would be advantageous if the wireless device system software could be differentiated into code sections, so that only specific code sections of system software would need to be replaced, in updating the system software. It would be advantageous if these code sections could be communicated to the wireless device via the airlink.

It would be advantageous if the wireless device could be operated with dynamically loaded instruction sets that would aid in the field updating of system software persistent data. It would be advantageous if this persistent data could be selectively updated to suit the needs, or to address the problems of particular users.

SUMMARY OF THE INVENTION

Wireless communications device software updates give customers the best possible product and user experience. An expensive component of the business involves the recall of handsets to update the software. These updates may be necessary to offer the user additional services or to address problems discovered in the use of the phone after it has been manufactured. The present invention makes it possible to practically upgrade handset software in the field, via the airlink interface. More specifically, the present invention permits the wireless communication device to execute dynamic instruction sets. These dynamic instruction sets permit the wireless device to "intelligently", or conditionally upgrade the system software and system data. Further, the dynamic instruction sets permit the wireless device to selectively make changes to the persistent data items that are used by the system software.

Accordingly, a method is provided for updating persistent data in a wireless communications device. The method comprises: executing system software; launching a run-time engine; receiving the patch manager run time instructions with dynamic instruction sets and new code sections, including updated persistent data, in a file system section in nonvolatile memory; processing dynamic instruction sets; in response to processing the dynamic instruction sets, selectively updating persistent data in the system software selected from the group including radio frequency (RF) calibration data, nonvolatile system and user configuration data, resource data, nonvolatile system and user application data, and arbitrary data; and, executing the system software with the updated persistent data.

Details of the above-described persistent data updating method, and a system for updating persistent data in a wireless communications device are provided below.

BRIEF DESCRIPTION OF THE DRAWING

FIG. 5 is a table representing the code section address table of FIG. 3.

FIG. 6 is a detailed depiction of symbol library one of FIG. 3, with symbols.

FIG. 7 is a table representing the symbol offset address table of FIG. 3.

DETAILED DESCRIPTION OF THE PREFERRED EMBODIMENTS

Some portions of the detailed descriptions that follow are presented in terms of procedures, steps, logic blocks, codes, processing, and other symbolic representations of operations on data bits within a wireless device microprocessor or memory. These descriptions and representations are the means used by those skilled in the data processing arts to most effectively convey the substance of their work to others skilled in the art. A procedure, microprocessor executed step, data item, application, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a microprocessor based wireless device. It has proven convenient at times, principally for reasons of common usage, to refer to these signals as bits, values, elements, symbols, characters, terms, data items, numbers, or the like. Where physical devices, such as a memory are mentioned, they are connected to other physical devices through a bus or other electrical connection. These physical devices can be considered to interact with logical processes or applications and, therefore, are "connected" to logical operations. For example, a memory can store or access code to further a logical operation, or an application can call a code section from memory for execution. Further, a software application can run an instruction using a data item.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "connecting" or "translating" or "displaying" or "prompting" or "determining" or "displaying" or "recognizing" or "comparing" or "replacing" or "addressing" or "retrieving" or the like, refer to the action and operations of in a wireless device microprocessor system that manipulates and transforms data represented as physical (electronic) quantities within the computer system's registers and memories into other data similarly represented as physical quantities within the wireless device memories or registers or other such information storage, transmission or display devices.

Figure 1:
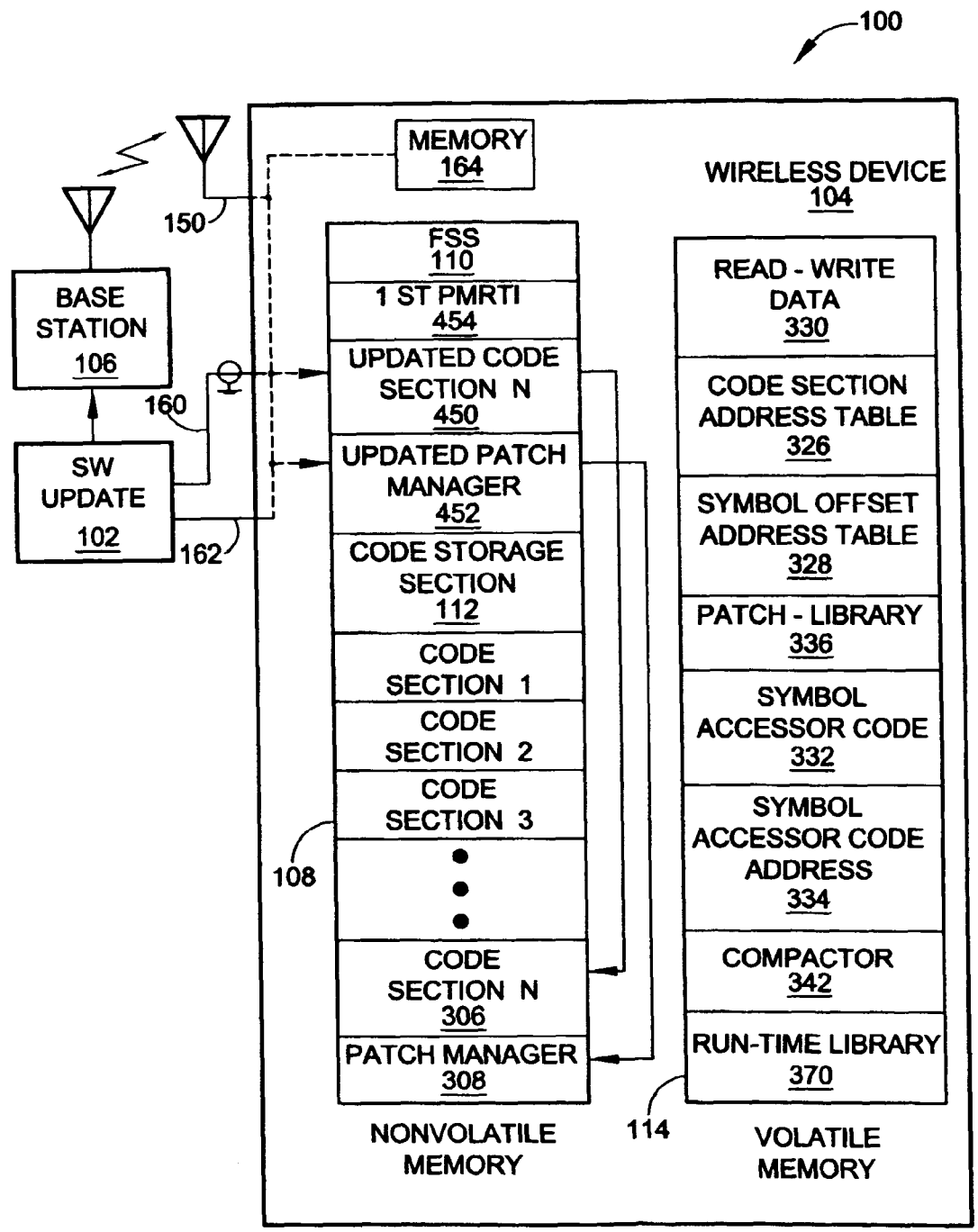
FIG. 1 is a schematic block diagram of the overall wireless device software maintenance system.

FIG. 1 is a schematic block diagram of the overall wireless device software maintenance system 100. The present invention system software organization is presented in detail below, following a general overview of the software maintenance system 100. The general system 100 describes a process of delivering system software updates and instruction sets (programs), and installing the delivered software in a wireless device. System software updates and patch manager run time instructions (PMRTI), that are more generally known as instruction sets or dynamic instruction sets, are created by the manufacturer of the handsets. The system software is organized into symbol libraries. The symbol libraries are arranged into code sections. When symbol libraries are to be updated, the software update 102 is transported as one or more code sections. The software update is broadcast to wireless devices in the field, of which wireless communications device 104 is representative, or transmitted in separate communications from a base station 106 using well known, conventional air, data or message transport protocols. The invention is not limited to any particular transportation format, as the wireless communications device can be easily modified to process any available over-the-air transport protocol for the purpose of receiving system software and PMRTI updates.

The system software can be viewed as a collection of different subsystems. Code objects can be tightly coupled into one of these abstract subsystems and the resulting collection can be labeled as a symbol library. This provides a logical breakdown of the code base and software patches and fixes can be associated with one of these symbol libraries. In most cases, a single update is associated with one, or at most, two symbol libraries. The rest of the code base, the other symbol libraries, remains unchanged.

The notion of symbol libraries provides a mechanism to deal with code and constants. The read-write (RW) data, on the other hand, fits into a unique individual RW library that contains RAM based data for all libraries.

Once received by the wireless device 104, the transported code section must be processed. This wireless device overwrites a specific code section of nonvolatile memory 108. The nonvolatile memory 108 includes a file system section (FSS) 110 and a code storage section 112. The code section is typically compressed before transport in order to minimize occupancy in the FSS 110. Often the updated code section will be accompanied by its RW data, which is another kind of symbol library that contains all the RW data for each symbol library. Although loaded in random access volatile read-write memory 114 when the system software is executing, the RW data always needs to be stored in the nonvolatile memory 108, so that it can be loaded into random access volatile read-write memory 114 each time the wireless device is reset. This includes the first time RW data is loaded into random access volatile read-write memory. As explained in more detail below, the RW data is typically arranged with a patch manager code section.

The system 100 includes the concept of virtual tables. Using such tables, symbol libraries in one code section can be patched (replaced), without breaking (replacing) other parts of the system software (other code sections). Virtual tables execute from random access volatile read-write memory 114 for efficiency purposes. A code section address table and symbol offset address table are virtual tables.

The updated code sections are received by the wireless device 104 and stored in the FSS 110. A wireless device user interface (UI) will typically notify the user that new software is available. In response to UI prompts the user acknowledges the notification and signals the patching or updating operation. Alternately, the updating operation is performed automatically. The wireless device may be unable to perform standard communication tasks as the updating process is performed. The patch manager code section includes a non-volatile read-write driver symbol library that is also loaded into random access volatile read-write memory 114. The non-volatile read-write driver symbol library causes code sections to be overwritten with updated code sections. The patch manager code section includes the read-write data, code section address table, and symbol offset address table, as well a symbol accessor code and the symbol accessor code address (discussed below). Portions of this data are invalid when updated code sections are introduced, and an updated patch manager code sections includes read-write data, a code section address table, and a symbol offset address table valid for the updated code sections. Once the updated code sections are loaded into the code storage section 112, the wireless device is reset. Following the reset operation, the wireless device can execute the updated system software. It should also be understood that the patch manager code section may include other symbol libraries that have not been discussed above. These other symbol libraries need not be loaded into read-write volatile memory 114.

Figure 2:
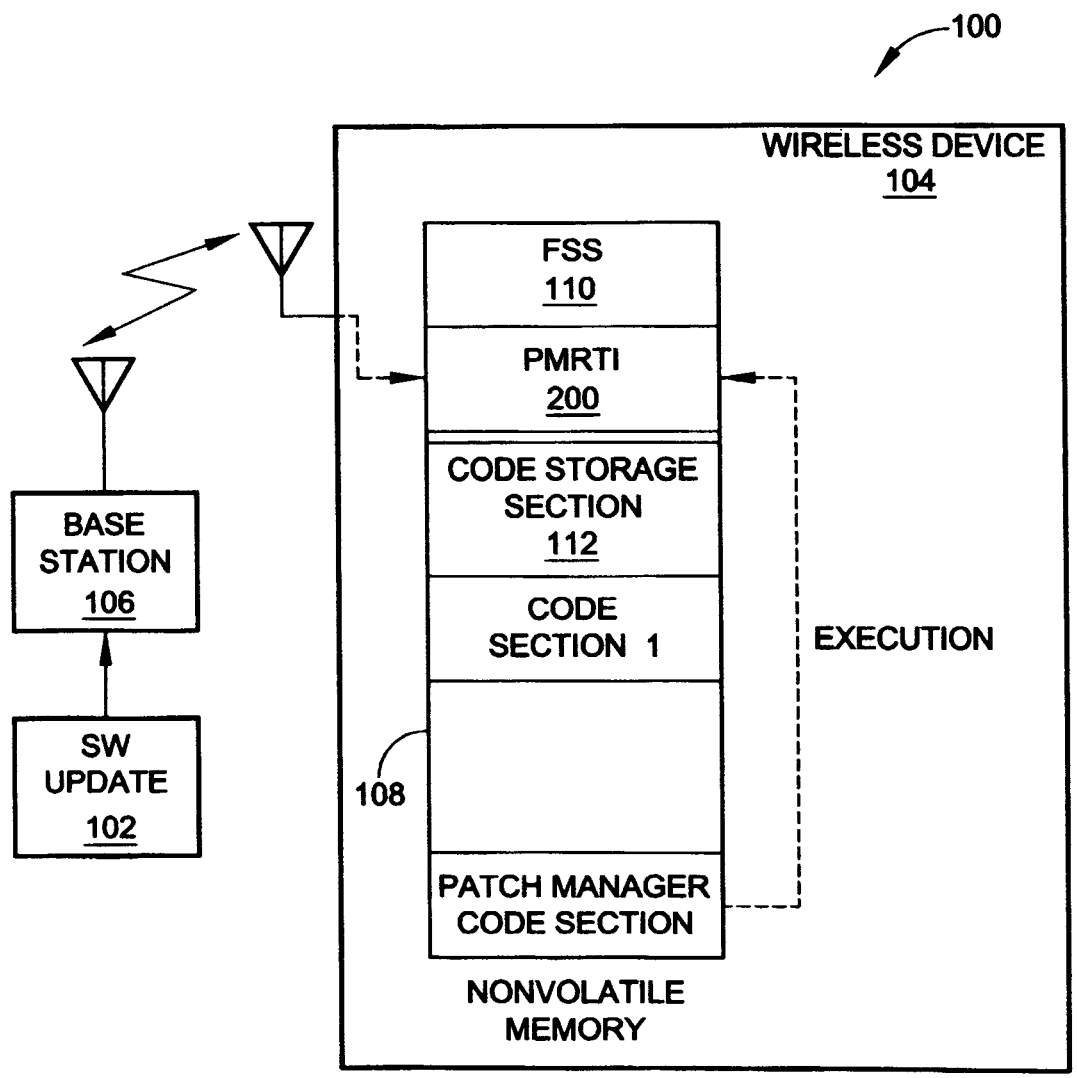
FIG. 2 is a schematic block diagram of the software maintenance system, highlighting the installation of instruction sets via the airlink interface.

FIG. 2 is a schematic block diagram of the software maintenance system 100, highlighting the installation of instruction sets via the airlink interface. In addition to updating system software code sections, the maintenance system 100 can download and install dynamic instructions sets, programs, or patch manager instruction sets (PMIS), referred to herein as patch manager run time instructions (PMRTI). The PMRTI code section 200 is transported to the wireless device 104 in the same manner as the above-described system software code sections. PMRTI code sections are initially stored in the FSS 110. A PMRTI code section is typically a binary file that may be visualized as compiled instructions to the handset. A PMRTI code section is comprehensive enough to provide for the performance of basic mathematical operations and the performance of conditionally executed operations. For example, an RF calibration PMRTI could perform the following operations:

IF RF CAL ITEM IS LESS THAN X
EXECUTE INSTRUCTION
ELSE
EXECUTE INSTRUCTION

A PMRTI can support basic mathematical operations, such as: addition, subtraction, multiplication, and division.

As with the system software code sections, the PMRTI code section may be loaded in response to UI prompts, and the wireless device must be reset after the PMRTI is loaded into code storage section 112. Then the PMRTI section can be executed. If the PMRTI code section is associated with any virtual tables or read-write data, an updated patch manager code section will be transported with the PMRTI for installation in the code storage section 112. Alternately, the PMRTI can be kept and processed from the FSS 110. After the handset 104 has executed all the instructions in the PMRTI section, the PMRTI section can be deleted from the FSS 110. Alternately, the PMRTI is maintained for future operations. For example, the PMRTI may be executed every time the wireless device is energized.

PMRTI is a very powerful runtime instruction engine. The handset can execute any instruction delivered to it through the PMRTI environment. This mechanism may be used to support RF calibrations. More generally, PMRTI can be used to remote debug wireless device software when software problems are recognized by the manufacturer or service provider, typically as the result of user complaints. PMRTI can also record data needed to diagnose software problems. PMRTI can launch newly downloaded system applications for data analysis, debugging, and fixes. PMRTI can provide RW data based updates for analysis and possible short term fix to a problem in lieu of an updated system software code section. PMRTI can provide memory compaction algorithms for use by the wireless device.

In some aspects of the invention, the organization of the system software into symbol libraries may impact the size of the volatile memory 114 and nonvolatile memory 108 required for execution. This is due to the fact that the code sections are typically larger than the symbol libraries arranged in the code sections. These larger code sections exist to accommodate updated code sections. Organizing the system software as a collection of libraries impacts the nonvolatile memory size requirement. For the same code size, the amount of nonvolatile memory used will be higher due to the fact that code sections can be sized to be larger than the symbol libraries arranged within.

Once software updates have been delivered to the wireless device, the software maintenance system 100 supports memory compaction. Memory compaction is similar to disk de-fragmentation applications in desktop computers. The compaction mechanism ensures that memory is optimally used and is well balanced for future code section updates, where the size of the updated code sections are unpredictable. The system 100 analyzes the code storage section as it is being patched (updated). The system 100 attempts to fit updated code sections into the memory space occupied by the code section being replaced. If the updated code section is larger than the code section being replaced, the system 100 compacts the code sections in memory 112. Alternately, the compaction can be calculated by the manufacturer or service provider, and compaction instructions can be transported to the wireless device 104.

Compaction can be a time consuming process owing to the complexity of the algorithm and also the vast volume of data movement. The compaction algorithm predicts feasibility before it begins any processing. UI prompts can be used to apply for permission from the user before the compaction is attempted.

In some aspects of the invention, all the system software code sections can be updated simultaneously. A complete system software upgrade, however, would require a larger FSS 110.

Figure 3:
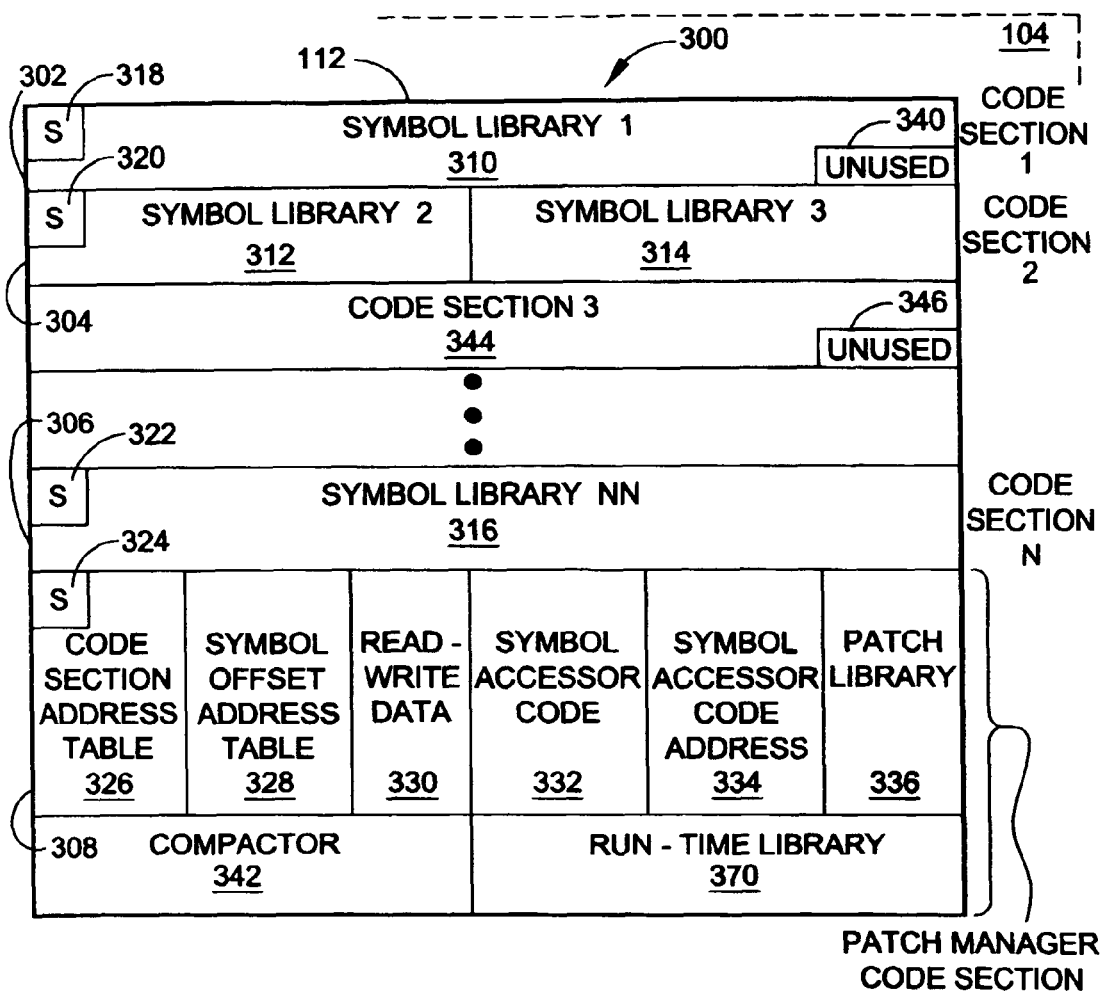
FIG. 3 is a schematic block diagram illustrating the present invention system for executing dynamic instruction sets in a wireless communications device.

FIG. 3 is a schematic block diagram illustrating the present invention dynamic instruction set execution in a wireless communications device. The system 300 comprises a code storage section 112 in memory 108 including executable wireless device system software differentiated into a plurality of current code sections. Code section one (302), code section two (304), code section n (306), and a patch manager code section 308 are shown. However, the invention is not limited to any particular number of code sections. Further, the system 300 further comprises a first plurality of symbol libraries arranged into the second plurality of code sections. Shown are symbol library one (310) arranged in code section one (302), symbol libraries two (312) and three (314) arranged in code section two (304), and symbol library m (316) arranged in code section n (306). Each library comprises symbols having related functionality. For example, symbol library one (310) may be involved in the operation of the wireless device liquid crystal display (LCD). Then, the symbols would be associated with display functions. As explained in detail below, additional symbol libraries are arranged in the patch manger code section 308.

Figure 4:
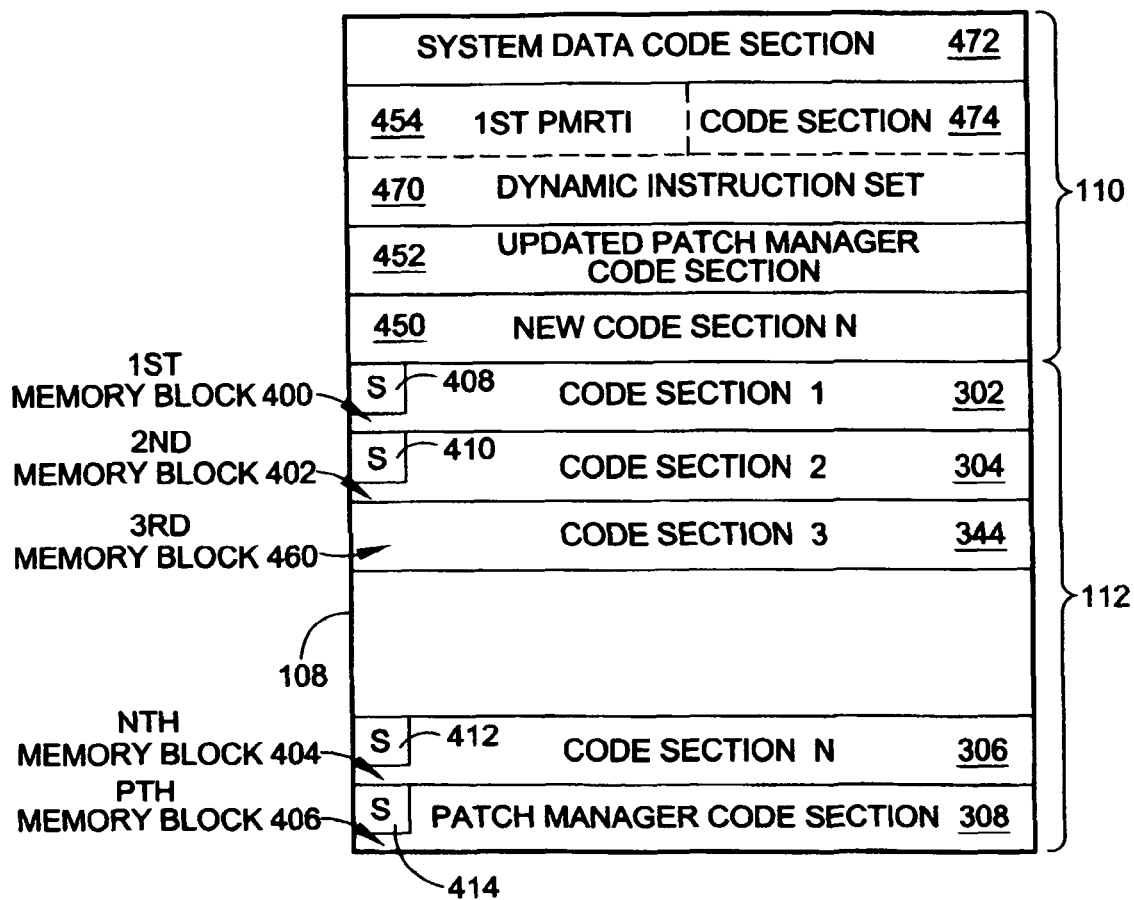
FIG. 4 is a schematic block diagram of the wireless device memory.

FIG. 4 is a schematic block diagram of the wireless device memory. As shown, the memory is the code storage section 112 of FIG. 1. The memory is a writeable, nonvolatile memory, such as Flash memory. It should be understood that the code sections need not necessarily be stored in the same memory as the FSS 110. It should also be understood that the present invention system software structure could be enabled with code sections stored in a plurality of cooperating memories. The code storage section 112 includes a second plurality of contiguously addressed memory blocks, where each memory block stores a corresponding code section from the second plurality of code sections. Thus, code section one (302) is stored in a first memory block 400, code section two (304) in the second memory block 402, code section n (306) in the nth memory block 404, and the patch manager code section (308) in the pth memory block 406.

Contrasting FIGS. 3 and 4, the start of each code section is stored at corresponding start addresses in memory, and symbol libraries are arranged to start at the start of code sections. That is, each symbol library begins at a first address and runs through a range of addresses in sequence from the first address. For example, code section one (302) starts at the first start address 408 (marked with "S") in code storage section memory 112. In FIG. 3, symbol library one (310) starts at the start 318 of the first code section. Likewise code section two (304) starts at a second start address 410 (FIG. 4), and symbol library two starts at the start 320 of code section two (FIG. 3). Code section n (306) starts at a third start address 412 in code storage section memory 112 (FIG. 4), and symbol library m (316) starts at the start of code section n 322 (FIG. 3). The patch manager code section starts at pth start address 414 in code storage section memory 112, and the first symbol library in the patch manager code section 308 starts at the start 324 of the patch manager code section. Thus, symbol library one (310) is ultimately stored in the first memory block 400. If a code section includes a plurality of symbol libraries, such as code section two (304), the plurality of symbol libraries are stored in the corresponding memory block, in this case the second memory block 402.

In FIG. 3, the system 300 further comprises a code section address table 326 as a type of symbol included in a symbol library arranged in the patch manager code section 308. The code section address table cross-references code section identifiers with corresponding code section start addresses in memory.

FIG. 5 is a table representing the code section address table 326 of FIG. 3. The code section address table 326 is consulted to find the code section start address for a symbol library. For example, the system 300 seeks code section one when a symbol in symbol library one is required for execution. To find the start address of code section one, and therefore locate the symbol in symbol library one, the code section address table 326 is consulted. The arrangement of symbol libraries in code sections, and the tracking of code sections with a table permits the code sections to be moved or expanded. The expansion or movement operations may be needed to install upgraded code sections (with upgraded symbol libraries).

Returning to FIG. 3, it should be noted that not every symbol library necessarily starts at the start of a code section. As shown, symbol library three (314) is arranged in code section two (304), but does not start of the code section start address 320. Thus, if a symbol in symbol library three (314) is required for execution, the system 300 consults the code section address table 326 for the start address of code section two (304). As explained below, a symbol offset address table permits the symbols in symbol library three (314) to be located. It does not matter that the symbols are spread across multiple libraries, as long as they are retained with the same code section.

As noted above, each symbol library includes functionally related symbols. A symbol is a programmer-defined name for locating and using a routine body, variable, or data structure. Thus, a symbol can be an address or a value. Symbols can be internal or external. Internal symbols are not visible beyond the scope of the current code section. More specifically, they are not sought by other symbol libraries, in other code sections. External symbols are used and invoked across code sections and are sought by libraries in different code sections. The symbol offset address table typically includes a list of all external symbols.

For example, symbol library one (310) may generate characters on a wireless device display. Symbols in this library would, in turn, generate telephone numbers, names, the time, or other display features. Each feature is generated with routines, referred to herein as a symbol. For example, one symbol in symbol library one (310) generates telephone numbers on the display. This symbol is represented by an "X", and is external. When the wireless device receives a phone call and the caller ID service is activated, the system must execute the "X" symbol to generate the number on the display. Therefore, the system must locate the "x" symbol.

FIG. 6 is a detailed depiction of symbol library one (310) of FIG. 3, with symbols. Symbols are arranged to be offset from respective code section start addresses. In many circumstances, the start of the symbol library is the start of a code section, but this is not true if a code section includes more than one symbol library. Symbol library one (310) starts at the start of code section one (see FIG. 3). As shown in FIG. 6, the "X" symbol is located at an offset of (03) from the start of the symbol library and the "Y" symbol is located at an offset of (15). The symbol offset addresses are stored in a symbol offset address table 328 in the patch manager code section (see FIG. 3).

FIG. 7 is a table representing the symbol offset address table 328 of FIG. 3. The symbol offset address table 328 cross-references symbol identifiers with corresponding offset addresses, and with corresponding code section identifiers in memory. Thus, when the system seeks to execute the "X" symbol in symbol library one, the symbol offset address table 328 is consulted to locate the exact address of the symbol, with respect to the code section in which it is arranged.

Returning to FIG. 3, the first plurality of symbol libraries typically all include read-write data that must be consulted or set in the execution of these symbol libraries. For example, a symbol library may include an operation dependent upon a conditional statement. The read-write data section is consulted to determine the status required to complete the conditional statement. The present invention groups the read-write data from all the symbol libraries into a shared read-write section. In some aspects of the invention, the read-write data 330 is arranged in the patch manager code section 308. Alternately (not shown), the read-write data can be arranged in a different code section, code section n (306), for example.

The first plurality of symbol libraries also includes symbol accessor code arranged in a code section to calculate the address of a sought symbol. The symbol accessor code can be arranged and stored at an address in a separate code section, code section two (304), for example. However, as shown, the symbol accessor code 332 is arranged and stored at an address in the patch manager code section 308. The system 300 further comprises a first location for storage of the symbol accessor code address. The first location can be a code section in the code storage section 112, or in a separate memory section of the wireless device (not shown). The first location can also be arranged in the same code section as the read-write data. As shown, the first location 334 is stored in the patch manager code section 308 with the read-write data 330, the symbol offset address table 328, the code section address table 326, and the symbol accessor code 332, and the patch library (patch symbol library) 336.

The symbol accessor code accesses the code section address table and symbol offset address tables to calculate, or find the address of a sought symbol in memory. That is, the symbol accessor code calculates the address of the sought symbol using a corresponding symbol identifier and a corresponding code section identifier. For example, if the "X" symbol in symbol library one is sought, the symbol accessor is invoked to seek the symbol identifier (symbol ID) "X_1", corresponding to the "X" symbol (see FIG. 7). The symbol accessor code consults the symbol offset address table to determine that the "X_1" symbol identifier has an offset of (03) from the start of code section one (see FIG. 6). The symbol accessor code is invoked to seek the code section identifier "CS_1", corresponding to code section one. The symbol accessor code consults the code section address table to determine the start address associated with code section identifier (code section ID) "CS_1". In this manner, the symbol accessor code determines that the symbol identifier "X_1" is offset (03) from the address of (00100), or is located at address (00103).

The symbol "X" is a reserved name since it is a part of the actual code. In other words, it has an absolute data associated with it. The data may be an address or a value. The symbol identifier is an alias created to track the symbol. The symbol offset address table and the code section address table both work with identifiers to avoid confusion with reserved symbol and code section names. It is also possible that the same symbol name is used across many symbol libraries. The use of identifiers prevents confusion between these symbols.

Returning to FIG. 1, the system 300 further comprises a read-write volatile memory 114, typically random access memory (RAM). The read-write data 330, code section address table 326, the symbol offset address table 328, the symbol accessor code 332, and the symbol accessor code address 334 are loaded into the read-write volatile memory 114 from the patch manager code section for access during execution of the system software. As is well known, the access times for code stored in RAM is significantly less than the access to a nonvolatile memory such as Flash.

Returning to FIG. 3, it can be noted that the symbol libraries need not necessarily fill the code sections into which they are arranged, although the memory blocks are sized to exactly accommodate the corresponding code sections stored within. Alternately stated, each of the second plurality of code sections has a size in bytes that accommodates the arranged symbol libraries, and each of the contiguously addressed memory blocks have a size in bytes that accommodates corresponding code sections. For example, code section one (302) may be a 100 byte section to accommodate a symbol library having a length of 100 bytes. The first memory block would be 100 bytes to match the byte size of code section one. However, the symbol library loaded into code section 1 may be smaller than 100 bytes. As shown in FIG. 3, code section one (302) has an unused section 340, as symbol library one (310) is less than 100 bytes. Thus, each of the second plurality of code sections may have a size larger than the size needed to accommodate the arranged symbol libraries. By "oversizing" the code sections, larger updated symbol libraries can be accommodated.

Contiguously addressed memory blocks refers to partitioning the physical memory space into logical blocks of variable size. Code sections and memory blocks are terms that are essentially interchangeable when the code section is stored in memory. The concept of a code section is used to identify a section of code that is perhaps larger than the symbol library, or the collection of symbol libraries in the code section as it is moved and manipulated.

As seen in FIG. 3, the system 300 includes a patch symbol library, which will be referred to herein as patch library 336, to arrange new code sections in the code storage section with the current code sections. The arrangement of new code sections with current code sections in the code storage section forms updated executable system software. The patch manager 336 not only arranges new code sections in with the current code sections, it also replaces code sections with updated code sections.

Returning to FIG. 4, the file system section 110 of memory 108 receives new code sections, such as new code section 450 and updated patch manager code section 452. The file system section also receives a first patch manager run time instruction (PMRTI) 454 including instructions for arranging the new code sections with the current code sections. As seen in FIG. 1, an airlink interface 150 receives new, or updated code sections, as well as the first PMRTI. Although the airlink interface 150 is being represented by an antenna, it should be understood that the airlink interface would also include an RF transceiver, baseband circuitry, and demodulation circuitry (not shown). The file system section 110 stores the new code sections received via the airlink interface 150. The patch library 336, executing from read-write volatile memory 114, replaces a first code section in the code storage section, code section n (306) for example, with the new, or updated code section 450, in response to the first PMRTI 454. Typically, the patch manager code section 308 is replaced with the updated patch manager code section 452. When code sections are being replaced, the patch library 336 over-writes the first code section, code section n (306) for example, in the code storage section 112 with the updated code sections, code section 450 for example, in the file system section 110. In the extreme case, all the code sections in code storage section 112 are replaced with updated code sections. That is, the FSS 110 receives a second plurality of updated code sections (not shown), and the patch library 336 replaces the second plurality of code sections in the code storage section 112 with the second plurality of updated code sections. Of course, the FSS 110 must be large enough to accommodate the second plurality of updated code sections received via the airlink interface.

As noted above, the updated code sections being received may include read-write data code sections, code section address table code sections, symbol libraries, symbol offset address table code sections, symbol accessor code sections, or a code section with a new patch library. All these code sections, with their associated symbol libraries and symbols, may be stored as distinct and independent code sections. Then each of these code sections would be replaced with a unique updated code section. That is, an updated read-write code section would be received and would replace the read-write code section in the code storage section. An updated code section address table code section would be received and would replace the code section address table code section in the code storage section. An updated symbol offset address table code section would be received and would replace the symbol offset address table code section in the code storage section. An updated symbol accessor code section would be received and would replace the symbol accessor code section in the code storage section. Likewise, an updated patch manager code section (with a patch library) would be received and would replace the patch manager code section in the code storage section.

However, the above-mentioned code sections are typically bundled together in the patch manager code section. Thus, the read-write code section in the code storage section is replaced with the updated read-write code section from the file system section 110 when the patch manager code section 308 is replaced with the updated patch manger code section 450. Likewise, the code section address table, the symbol offset address table, the symbol accessor code sections, as well as the patch library are replaced when the updated patch manager code section 450 is installed. The arrangement of the new read-write data, the new code section address table, the new symbol offset address table, the new symbol accessor code, and the new patch library as the updated patch manager code section 450, together with the current code sections in the code storage section, forms updated executable system software.

When the file system section 110 receives an updated symbol accessor code address, the patch manager replaces the symbol accessor code address in the first location in memory with updated symbol accessor code address. As noted above, the first location in memory 334 is typically in the patch manager code section (see FIG. 3).

As seen in FIG. 3, the patch library 308 is also includes a compactor, or a compactor symbol library 342. The compactor 342 can also be enabled as a distinct and independent code section, however as noted above, it is useful and efficient to bundle the functions associated with system software upgrades into a single patch manager code section. Generally, the compactor 342 can be said to resize code sections, so that new sections can be arranged with current code sections in the code storage section 112.

With the organization, downloading, and compaction aspects of the invention now established, the following discussion will center on the wireless communications device dynamic instruction set execution system 300. The system 300 comprises executable system software and system data differentiated into code sections, as discussed in great detail, above. Further, the system 300 comprises dynamic instruction sets for operating on the system data and the system software, and controlling the execution of the system software. As seen in FIG. 4, a dynamic instruction set 470 is organized into the first PMRTI 454. As seen in FIG. 3, the system also comprises a run-time engine for processing the dynamic instruction sets, enabled as run-time library 370. As with the compactor library 342 and patch library 336 mentioned above, the run-time library 370 is typically located in the patch manager code section 308. However, the run-time library 370 could alternately be located in another code section, for example the first code section 304.

The dynamic instruction sets are a single, or multiple sets of instructions that include conditional operation code, and generally include data items. The run-time engine reads the operation code and determines what operations need to be performed. Operation code can be conditional, mathematical, procedural, or logical. The run-time engine, or run-time library 370 processes the dynamic instruction sets to perform operations such as mathematical or logical operations. That is, the run-time engine reads the dynamic instruction set 470 and performs a sequence of operations in response to the operation code. Although the dynamic instruction sets are not limited to any particular language, the operation code is typically a form of machine code, as the wireless device memory is limited and execution speed is important. The operation code is considered conditional in that it analyzes a data item and makes a decision as a result of the analysis. The run-time engine may also determine that an operation be performed on data before it is analyzed.

For example, the operation code may specify that a data item from a wireless device memory be compared to a predetermined value. If the data item is less than the predetermined value, the data item is left alone, and if the data item is greater than the predetermined value, it is replaced with the predetermined value. Alternately, the operation code may add a second predetermined value to a data item from the wireless device memory, before the above-mentioned comparison operation is performed.

As mentioned above, the file system section nonvolatile memory 110 receives the dynamic instruction sets through an interface such as the airlink 150. As shown in FIG. 1, the interface can also be radio frequency (RF) hardline 160. Then, the PMRTI can be received by the FSS 110 without the system software being operational, such as in a factory calibration environment. The PMRTI can also be received via a logic port interface 162 or an installable memory module 164. The memory module 164 can be installed in the wireless device 104 at initial calibration, installed in the field, or installed during factory recalibration. Although not specially shown, the PMRTI can be received via an infrared or Bluetooth interfaces.

Figure 8A:
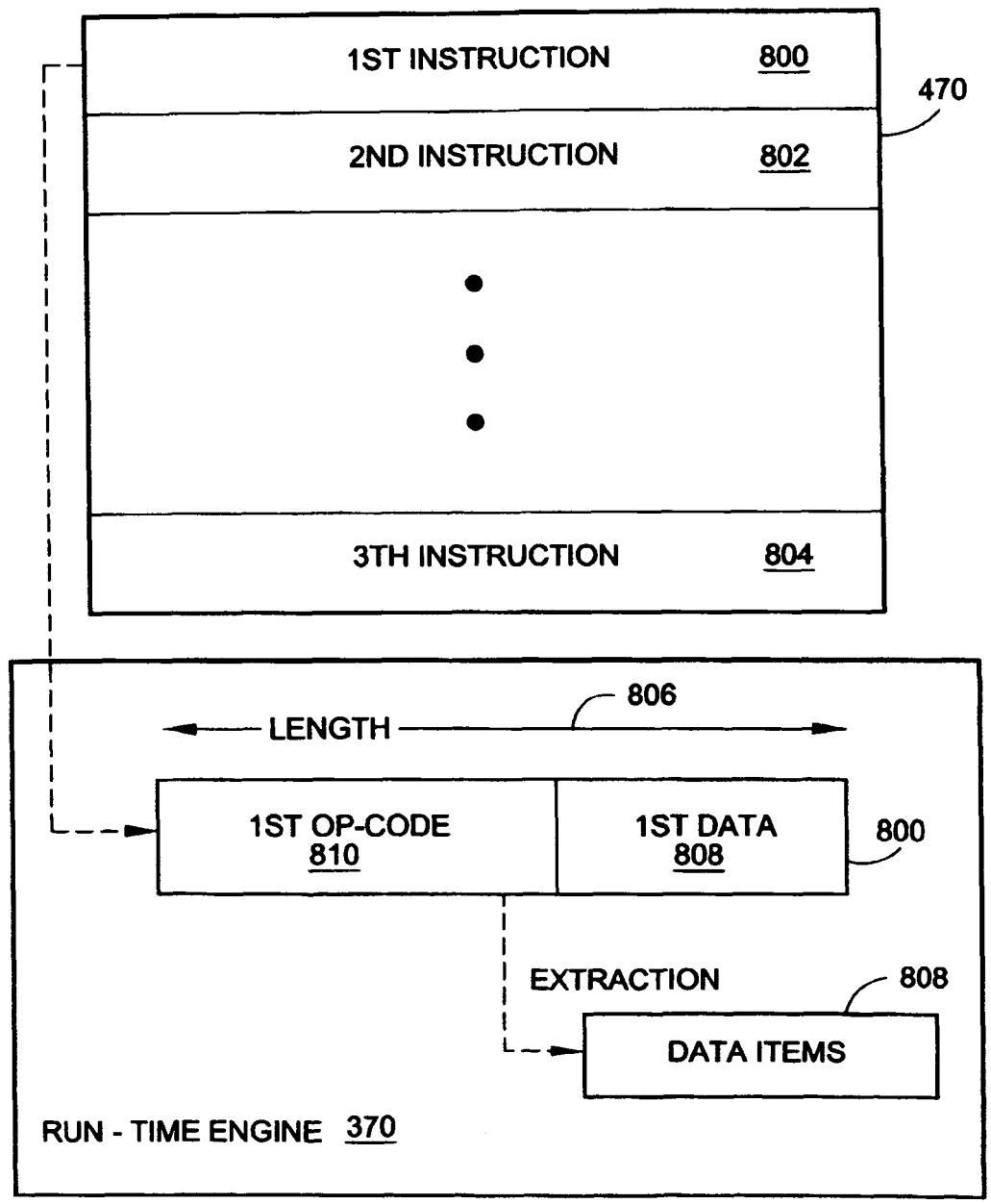
FIGS. 8a and 8b are depictions of the operation code (op-code) being accessed by the run-time engine.
Figure 8B:
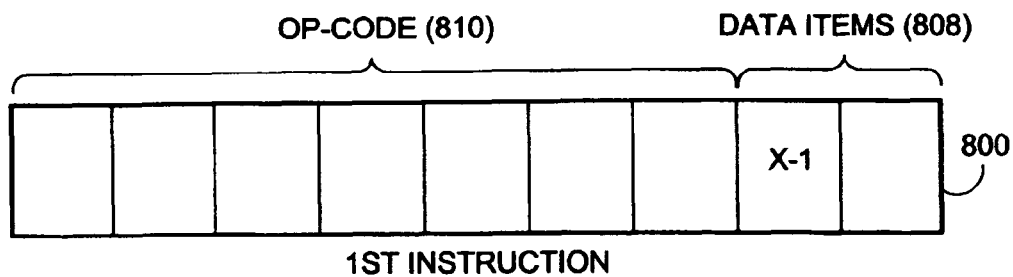

FIGS. 8a and 8b are depictions of instructions being accessed by the run-time engine 370. Shown in FIG. 8a is a first instruction 800, a second instruction 802, and a jth instruction 804, however, the dynamic instruction set is not limited to any particular number of instructions. The length of the operation code in each instruction is fixed. The run-time engine 370 captures the length of the instruction, as a measure of bytes or bits, to determine if the instruction includes data items. The remaining length of the instruction, after the operation code is subtracted, includes the data items. The run-time engine extracts the data items from the instruction. As shown, the length 806 of the first instruction 800 is measured and data items 808 are extracted. Note that not all instructions necessary include data items to be extracted. The run-time engine 370 uses the extracted data 808 in performing the sequence of operations responsive to the operation code 810 in instruction 800.

FIG. 8b is a more detailed depiction of the first instruction 800 of FIG. 8a. Using the first instruction 800 as an example, the instruction includes operation code 810 and data 808. The instruction, and more specifically, the data item section 808 includes symbol identifiers, which act as a link to symbols in the wireless device code sections. As explained in detail above, the symbol identifiers are used with the code section address table 326 (see FIG. 5) and the symbol offset address table 328 (see FIG. 7) to locate the symbol corresponding to the symbol identifier. As shown, a symbol identifier "X_1" is shown in the first instruction 800. The symbol offset address table 328 locates the corresponding symbol in a code section with the "CS_1" identifier and an offset of "3". The code section address table 326 gives the start address of code section one (302). In this manner, the symbol "X" is found (see FIG. 6).

After the run-time engine locates symbols corresponding to the received symbol identifiers using the code section address table and symbol offset address table, it extracts data when the located symbols are data items. For example, if the symbol "X" is a data item in symbol library one (310), the run-time engine extracts it. Alternately, the "X" symbol can be operation code, and the run-time engine executes the symbol "X" when it is located.

PMRTI can be used to update system data, or system data items. In some aspects of the invention system data is stored in a code section in the file system section 110, code section 472 for example, see FIG. 4. The run-time engine accesses system data from code section 472 and analyzes the system data. The run-time engine processes the operation code of the dynamic instruction sets to perform mathematical or logical operation on data items, as described above. After the operation, the run-time engine processes the instructions to create updated system data. Note that the updated system data may include unchanged data items in some circumstances. The system data in the second code section 472 is replaced with the updated system data in response to the operation code. Thus, by the processing of instruction by the run-time engine, the system software is controlled to execute using the updated system data in code section 472. In this manner, specifically targeted symbols in the system software can be updated, without replacing entire code sections. By the same process, the system data can be replaced in a code section in the code storage section 112. For example, the system data can be stored in the third code section 344, and the run-time engine can replace the system data in the third code section with updated system data in response to the operation code.

PMRTI can also be used to update data items in volatile memory 114. As an example, the volatile memory 114 accept read-write data 330, see FIG. 1. The read-write data can be from one, or from a plurality of code sections in the code storage section 112 and/or the FSS 110. The run-time engine accesses the read-write data, analyzes the read-write data 330, creates updated read-write data, and replaces the read-write data 330 in the volatile memory 114 with the updated read-write data in response to the operation code. Then, the system software is controlled to execute using the updated read-write data in volatile memory 114.

In some aspects of the invention, the run-time engine monitors the execution of the system software. Performance monitoring is broadly defined to include a great number of wireless device activities. For example, data such as channel parameters, channel characteristics, system stack, error conditions, or a record of data items in RAM through a sequence of operations leading to a specific failure condition or reduced performance condition can be collected. It is also possible to use dynamic instructions sets to analyze collected performance data, provide updated data variants, and recapture data to study possible solutions to the problem. Temporary fixes can also be provisioned using PMRTI processes.

More specifically, the run-time engine collects performance data, and stores the performance data in the file system section in response to the operation code. Then, the system software is controlled to execute by collecting the performance data for evaluation of the system software. Evaluation can occur as a form of analysis performed by dynamic instruction set operation code, or it can be performed outside the wireless device. In some aspects of the invention, the run-time engine accesses the performance data that has been collected from the file system section and transmits the performance data via an airlink interface in response to the operation code. Collecting performance data from wireless devices in the field permits a manufacturer to thoroughly analyze problems, either locally or globally, without recalling the devices.

In some aspects of the invention, file system section 110 receives a patch manager run time instruction including a new code section. For example, a new code section 474 is shown in FIG. 4.

Alternately, the new code section can be independent of the PMRTI, such as new code section n (450). For example, the new code section n (450) may have been received in earlier airlink communications, or have been installed during factory calibration. The run-time engine adds the new code section 474 (450) to the code storage section in response to the operation code. In some aspects of the invention, the new code section is added to an unused block in the code storage section 112. Alternately, a compaction operation is required. Then, the system software is controlled to execute using the new code section 474 (450). In other aspects of the invention, the PMRTI 454 includes an updated code section 474.

Alternately, the new code section 450 is an updated code section independent of the PMRTI. The run-time engine replaces a code section in the code storage section, code section two (304) for an example, with the updated code section 474 (450) in response to the operation code. The system software is controlled to execute using the updated code section 474 (450). In some aspects of the invention a compaction operation is required to accommodate the updated code section. Alternately, the updated code section is added to an unused or vacant section of the code storage section.

As explained above, the addition of a new code section or the updating of a code section typically requires the generation of a new code section address table, as these operation involve either new and/or changed code section start addresses. Further, a compaction operation also requires a new code section address table. The compaction operations may be a result of the operation of the compactor 342, explained above, or the result of PMRTI instructions that supply details as to how the compaction is to occur. When the PMRTI includes downloading and compaction instructions, the PMRTI typically also includes a new code section address table that becomes valid after the downloading and compaction operations have been completed.

Figure 9:
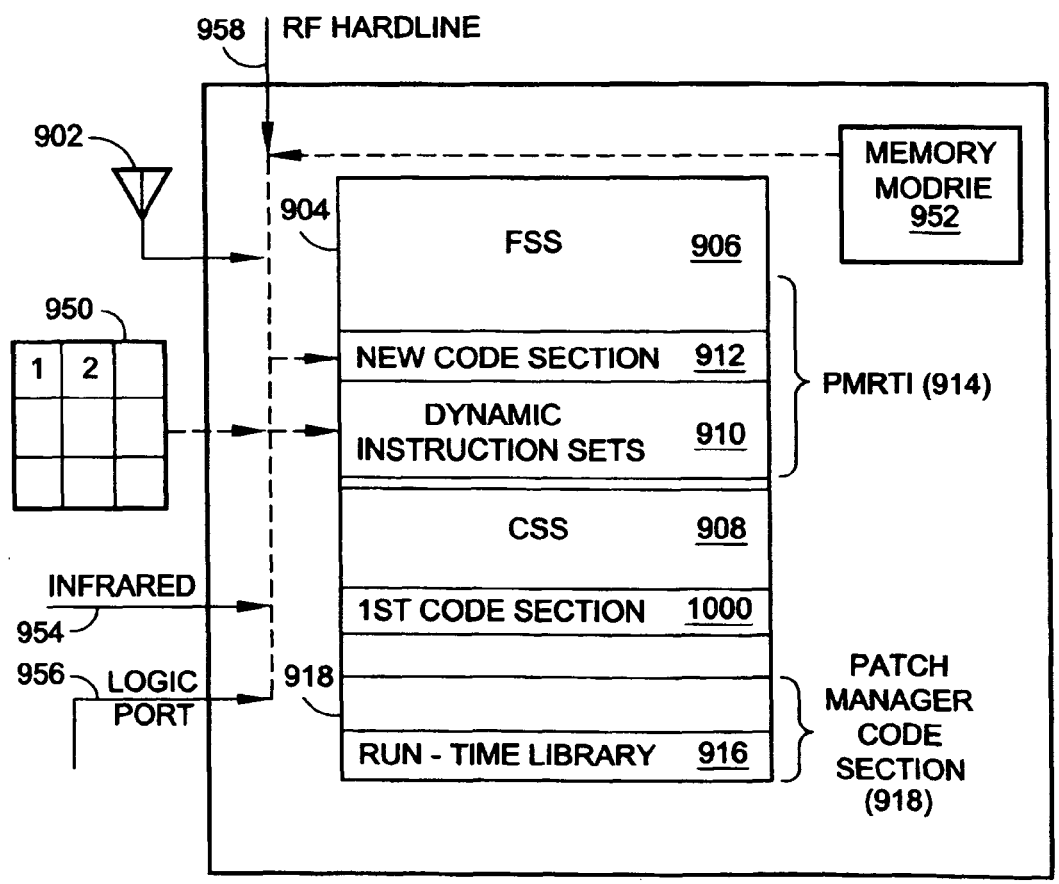
FIG. 9 is a schematic block diagram illustrating the present invention system for updating persistent data in the system software of a wireless communications device.

FIG. 9 is a schematic block diagram illustrating the present invention system for updating persistent data in the system software of a wireless communications device. The system 900 comprises an airlink interface 902, equivalent the airlink interface 150 of FIG. 1, and executable system software and system data differentiated into code sections stored in nonvolatile memory permanent storage 904, equivalent to memory 108 of FIG. 1. System 900 is substantially the same as system 100 described above, and the similar features will not be repeated in the interest of brevity. The nonvolatile permanent storage 904 includes a file system section 906 and code storage section 908.

Dynamic instruction sets 910 for selectively updating persistent data in the system software are received via the airlink interface 902. Persistent data is understood to be system software data items that are generally maintained as a fixed or constant value. For example, persistent data can be a fixed number that is used in a calculation of an RF attenuator value, determined in response to receiving a transmit power level command by a base station. The change in the persistent data may be made to account for regional temperature differences or variations in RF power transistor lots. Such a change permits the wireless device to permanently correct its calibration process.

Besides RF calibration data, nonvolatile system and user configuration data, resource data, nonvolatile system and user application data, and arbitrary data are all types of persistent data that can be updated. Nonvolatile system and user configuration data, resource data, nonvolatile system and user application data are described in greater detail below. Arbitrary data is understood to be any type of system software data item that is not covered by the above-mentioned data categories.

The system is said to update persistent data selectively because not all the data items in a code section or symbol library need be replaced in bulk, as in some prior art processes. That is, single or multiple data items in a code section can be updated. The updating is further selective in potentially using conditional logic or mathematical operations to both determine the data items to be replaced, and the value to be used as the replacement. Finally, the system is able to update persistent data from a large variety of data classes mentioned above.

The dynamic instruction sets 910, as well as new code sections 912, are part of patch manager run time instructions 914. Typically, the dynamic instruction sets 910 are stored in the file system section 906. A run-time engine, or run-time library 916 processes the dynamic instruction sets 910. As mentioned above, the run-time library 916 is typically part of the patch manager code section 918. The executable system software and system data (code sections in permanent memory 904) are updated in response to processing the dynamic instruction sets. The system software is executed following the system software persistent data updates made by the dynamic instruction sets 910.

As mentioned in detail above, the system software is formed into symbol libraries. Each symbol library comprises symbols having related functionality that are arranged into code sections in nonvolatile memory 904 (either the code storage section 908 or the file system section 904). The file system section 906 of nonvolatile memory receives patch manager run time instructions (PMRTI) 914, including dynamic instruction sets 910 and new code sections (new code section 912 is shown). These dynamic instruction sets and new code sections can include updated persistent data and persistent data instructions.

The system 900 may comprise other interfaces, aside from the airlink interface 902. For example, a wireless communications device keyboard or keypad 950, an installable memory module 952, an infrared interface 954, a logic port 956, and RF hardline interface 958. The file system section 906 is capable of receiving updated persistent data through any of these interfaces.

Figure 10:
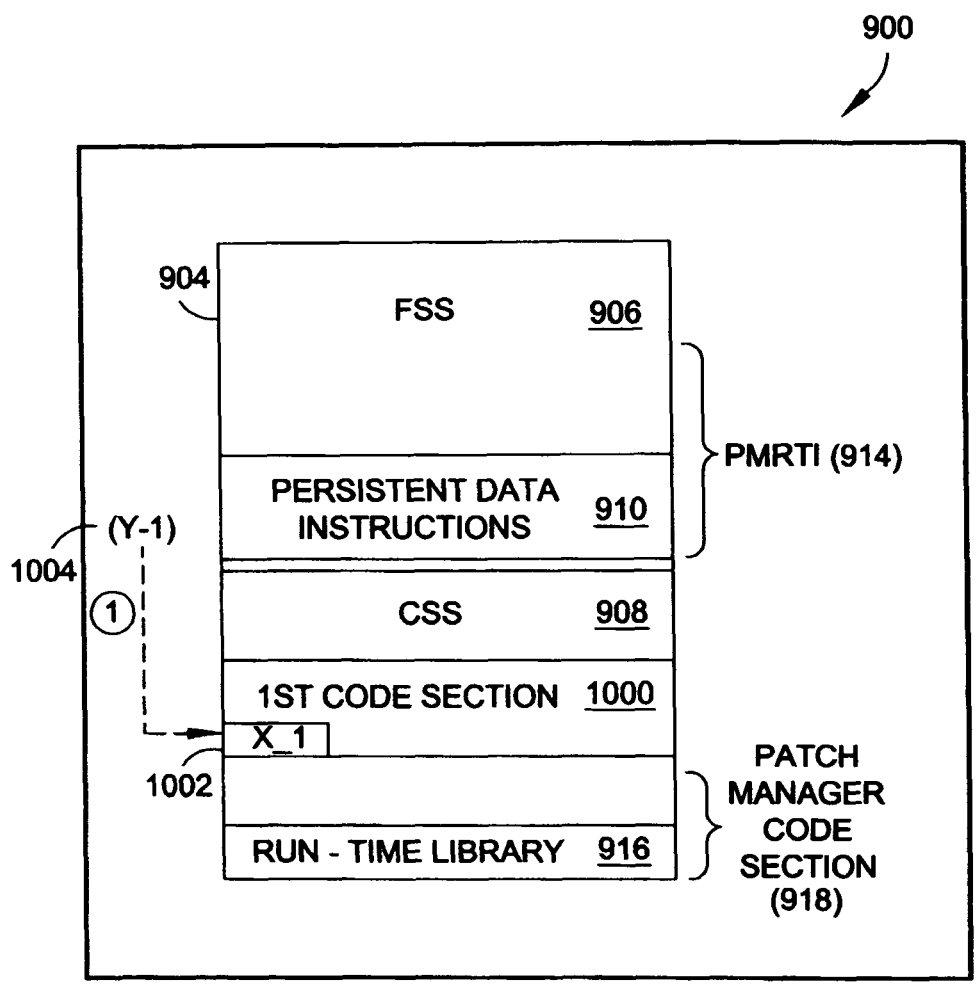
FIG. 10 is a schematic block diagram illustrating a general expression of the system of FIG. 9.

FIG. 10 is a schematic block diagram illustrating a general expression of the system 900 of FIG. 9. The file system section 906 receives dynamic instruction sets including persistent data instructions 910. The system software includes a plurality of persistent data items in a first code section 1000. A persistent data item X_1 is depicted with reference designator 1002. It should be understood that a code section would normally include many persistent data items. The persistent data instructions 910 cause persistent data items in the first code section 1000 to be replaced with updated persistent data items. As shown, updated persistent data item Y_1 (1004) is replacing data item X_1 (1002), see dotted arrow labeled "1". As described below, the updated persistent data is updated through a variety of means. Although the first code section is shown located in code storage section 908, it should also be understood that the first code section could alternately be located in the file system section 906 and that the present invention system can update persistent data items in the file system section 906 of permanent memory 904.

Figure 11A:
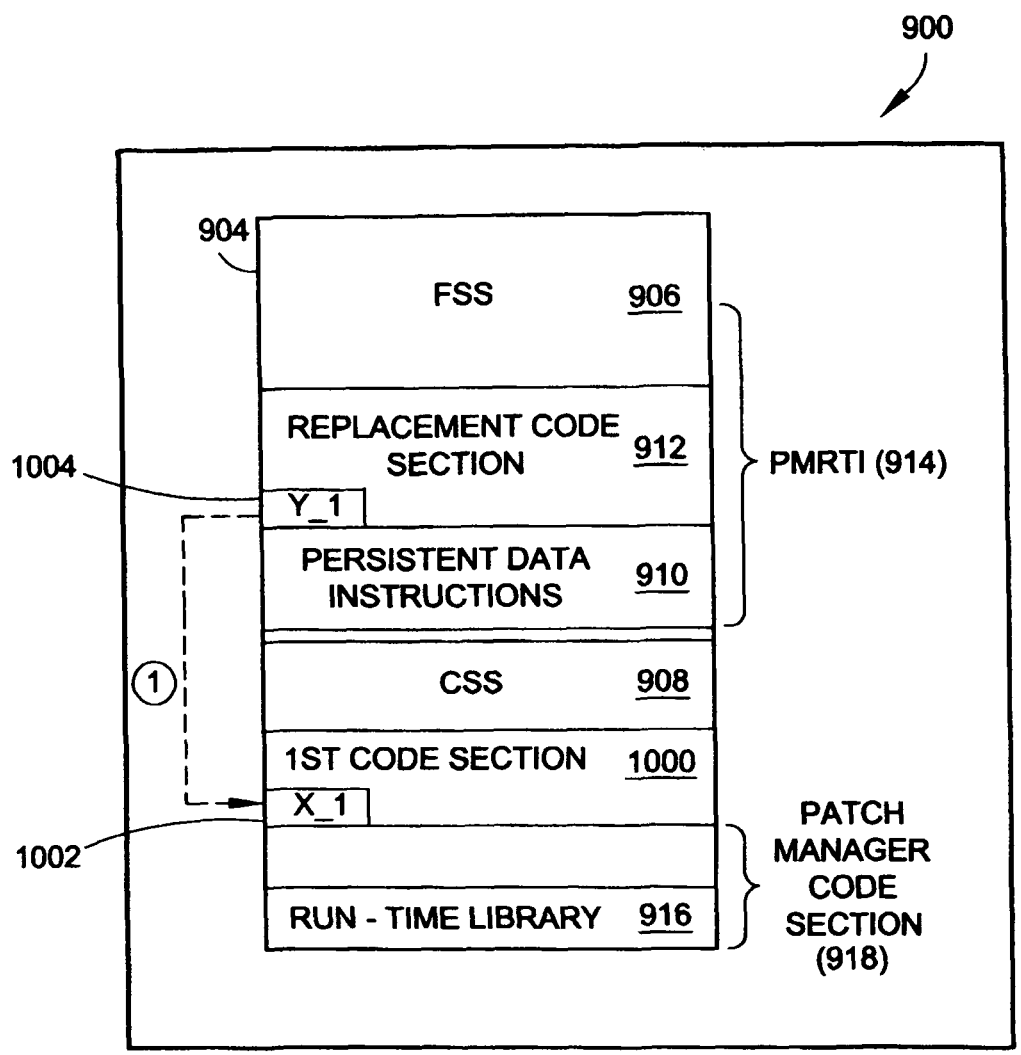
FIGS. 11a and 11b are schematic block diagrams illustrating the replacement code section aspect of the present invention system of FIG. 10.
Figure 11B:
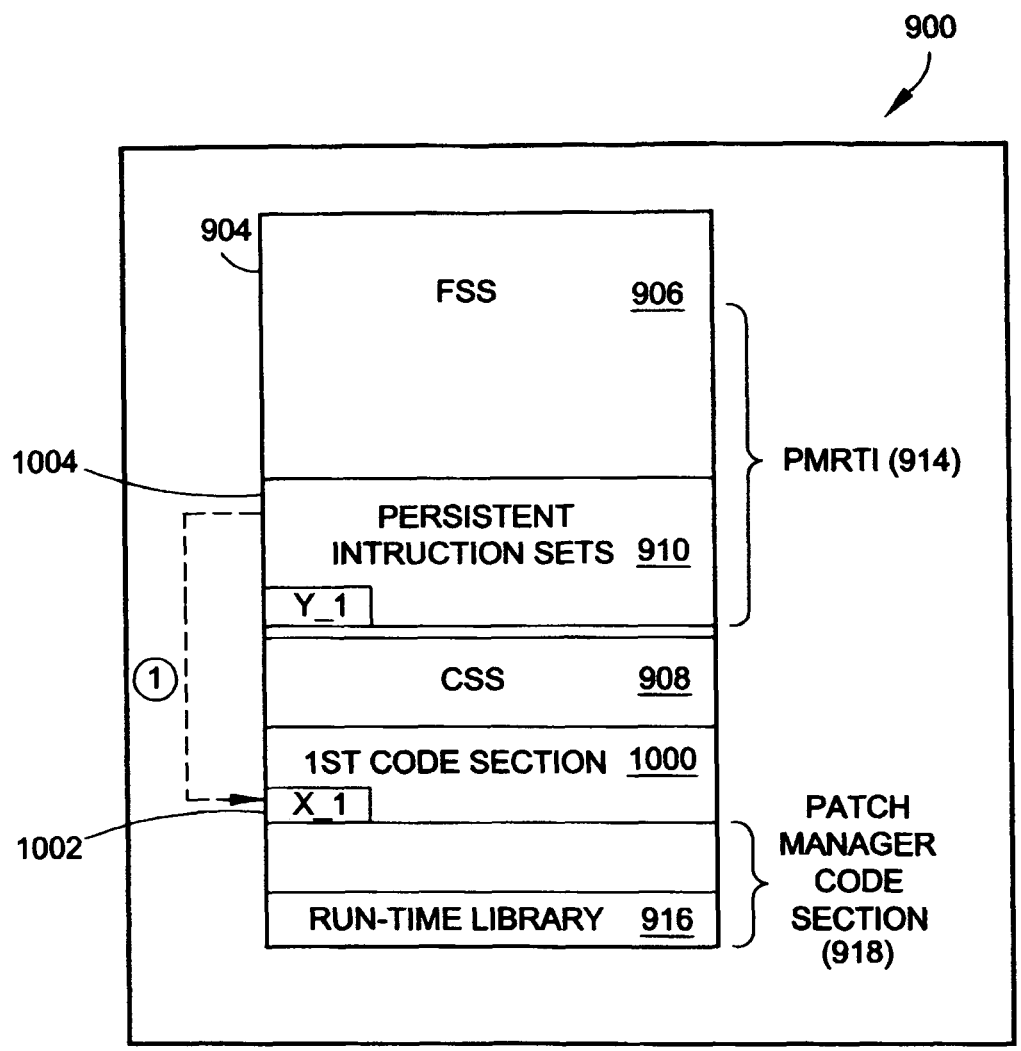

FIGS. 11a and 11b are schematic block diagrams illustrating the replacement code section aspect of the present invention system 900 of FIG. 10. FIG. 11a illustrates one aspect of the data item replacement process. The file system section 906 receives a replacement code section 912, typically with a plurality of data items, but the code section 912 could include as few as one data item. Alternately, the replacement data items could be distributed in a plurality of replacement code sections. The persistent data instructions 910 replace the persistent data items in the first code section 1000 with the data items from the replacement code section. As shown, data item X_1 (1002) is being replaced with data item Y_1 (1004) from replacement code section 912, see dotted arrow labeled "1".

FIG. 11b is a schematic block diagram illustrating a variation of the replacement code section aspect of the present invention system 900. In some aspects of the invention, the file system section 906 receives replacement data items embedded with the persistent data instructions 910. The persistent data instructions 910 replace the persistent data items in the first code section 1000 with the data items embedded in the persistent data instructions. As shown, data item X_1 (1002) is being replaced with data item Y_1 (1004) from the persistent instruction sets 910, see dotted arrow labeled "1". Although the first code section is shown located in code storage section 908, it should also be understood that the first code section could alternately be located in the file system section 906 and that the replacement aspect of the present invention system can update persistent data items in the file system section 906 of permanent memory 904.

Figure 12:
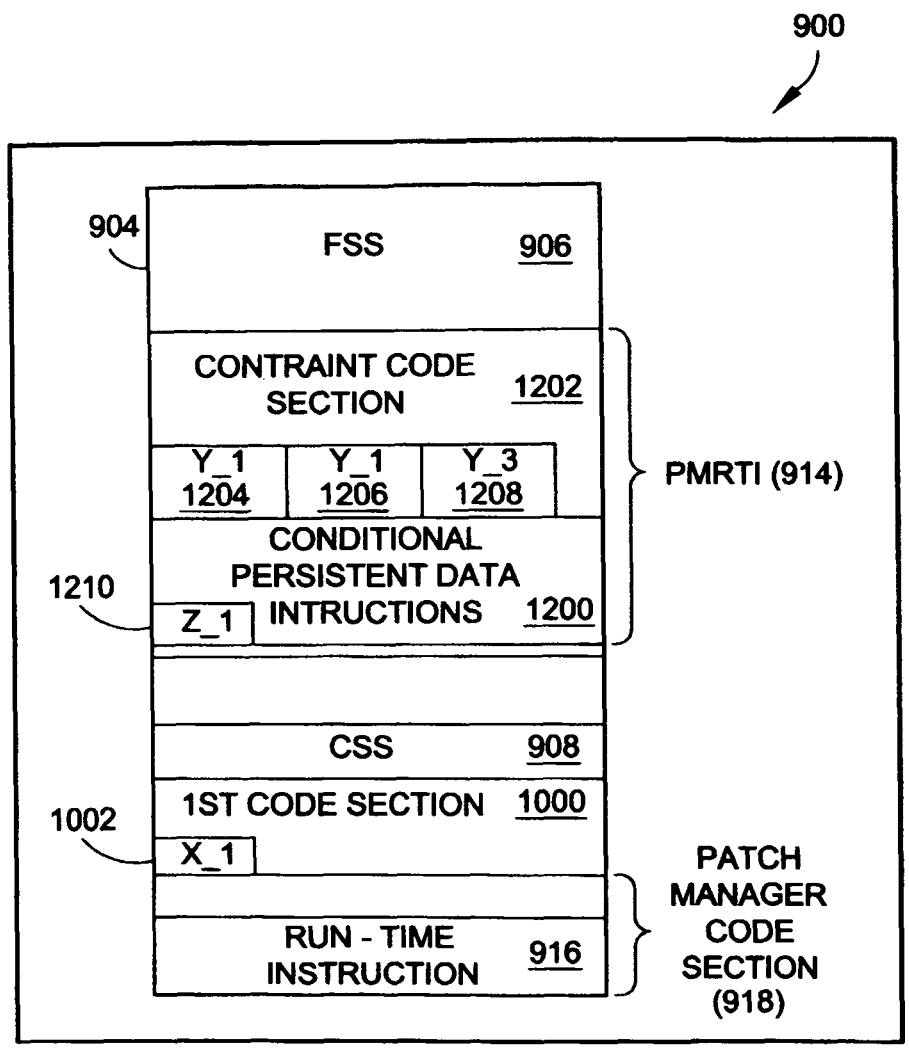
FIG. 12 is a schematic block diagram illustrating the conditional logic aspect of the present invention system.

FIG. 12 is a schematic block diagram illustrating the conditional logic aspect of the present invention system 900. The file system section 906 receives a plurality of constraint data items and conditional persistent data instructions 1200. The conditional persistent data instructions 1200 can be considered to be a subset of a persistent instructions set that specifically uses conditional logic or mathematical operations to perform the data item replacements. The conditional persistent data instructions 1200 compare the persistent data items in the first code section 1000 with the constraint data items. In response to comparing the persistent data items in the first code section 1000 with the constraint data items, the conditional persistent data instructions 1200 replace the persistent data items in the first code section 1000.

In one aspect of the invention, the file system section 906 receives a constraint code section 1202 with a plurality of data items. Data items Y_1 (1204), Y_2 (1206), and Y_3 (1208) are shown. The conditional persistent data instructions 1200 replace persistent data items in the first code section 1000 with data items from the constraint code section 1202, in response to comparing the persistent data items in the first code section 1000 with the data items in the constraint code section 1202.

Figure 13:
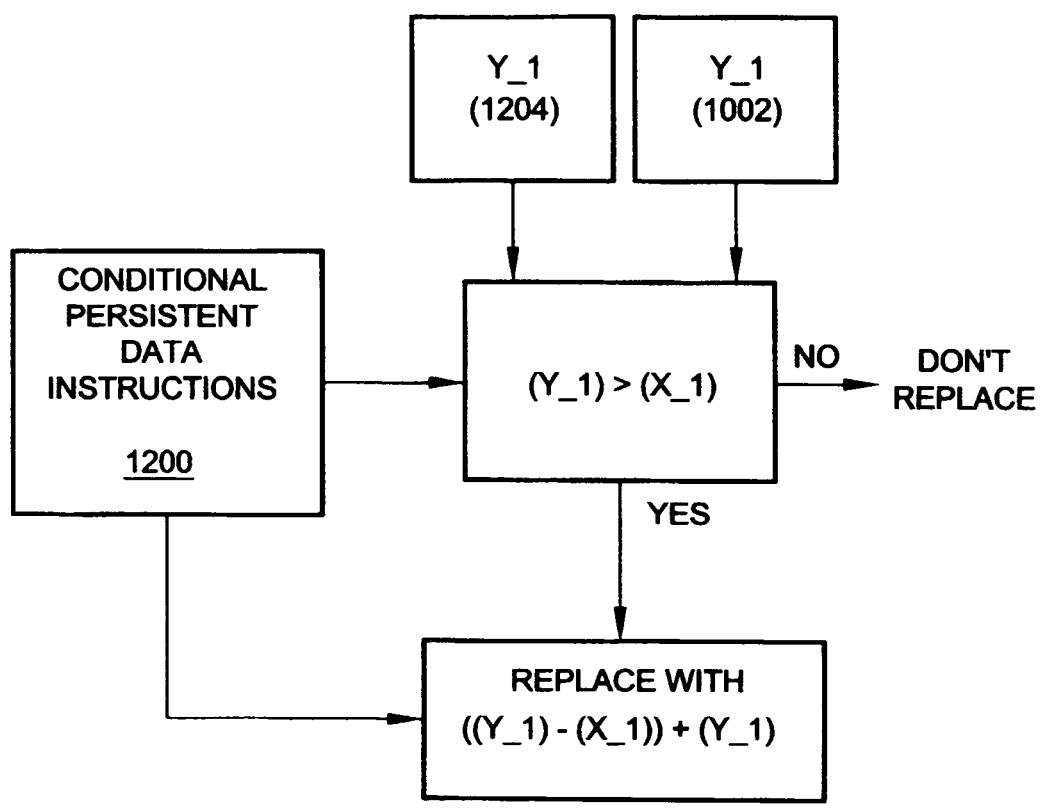
FIG. 13 is a schematic diagram illustrating the operation of the conditional persistent data instructions.

FIG. 13 is a schematic diagram illustrating the operation of the conditional persistent data instructions. As shown in this example, the conditional persistent data instructions 1200 may compare data item X_1 (1002) from the first code section 1000 to data item Y_1 (1204) from the constraint data section 1202. The conditional operation may be: is (Y_1 >X_1)? As a result of this operation the conditional persistent data instructions 1200 may decide to leave X_1 (1002) in place, to replace X_1 (1002) with Y_1 (1204), to replace X_1 (1002) with Y_2 (1206), or to replace X_1 (1002) with a calculated value, to name but a few possible outcomes. Thus, the conditional persistent data instructions 1200 may replace persistent data items in the first code section 1000 with data items calculated by the conditional persistent data instructions 1202, in response to comparing the persistent data items (i.e., X_1) in the first code section 1000 with the constraint data items (i.e., Y_1). For example (as shown), the calculation may find the difference between Y_1 and X_1, add the difference to Y_1, and use the result to replace X_1.

Alternately, the conditional persistent data instructions 1200 use the constraint data items as operands in calculations to create data item products. The persistent data items in the first code section are then replaced with the data item products. For example, if Y_1 is greater than X_1 the calculation may be to multiple the operand Y_1 by 3, and use the product to replace X_1. In another variation, if Y_1 is greater than X_1, the calculation may be to multiple the operand Y_2 by 3, and use the product to replace X_1. It should also be understood that the conditional logic or mathematic operations are processed using conventional software operations, and so may be any operation that can be performed using software.

Returning to FIG. 12, in some aspects of the invention the file system section 906 receives constraint data items, such as data item Z_1 (1210) embedded with the conditional persistent data instructions 1200. Then, the conditional persistent data instructions 1200 replace persistent data items in the first code section 1000 with constraint data items embedded in the conditional persistent data instructions 1200, in response to comparing the persistent data items in the first code section 1000 with the constraint data items. Although not specifically shown, the conditional persistent data instructions 1200 would perform a conditional logic or mathematical operation, comparing X_1 (1002) to Z_1 (1210) for example, and a replacement decision would be made as a result of that comparison. Further, the data item could be simply replaced with an embedded data item, or the replacement data item can be generated as a product of a mathematical operation using a data item embedded in the conditional persistent data instructions 1200. Although the first code section is shown located in code storage section 908, it should also be understood that the first code section could alternately be located in the file system section 906 and that the conditional logic aspect of the present invention system can update persistent data items in the file system section 906 of permanent memory 904.

Figure 14:
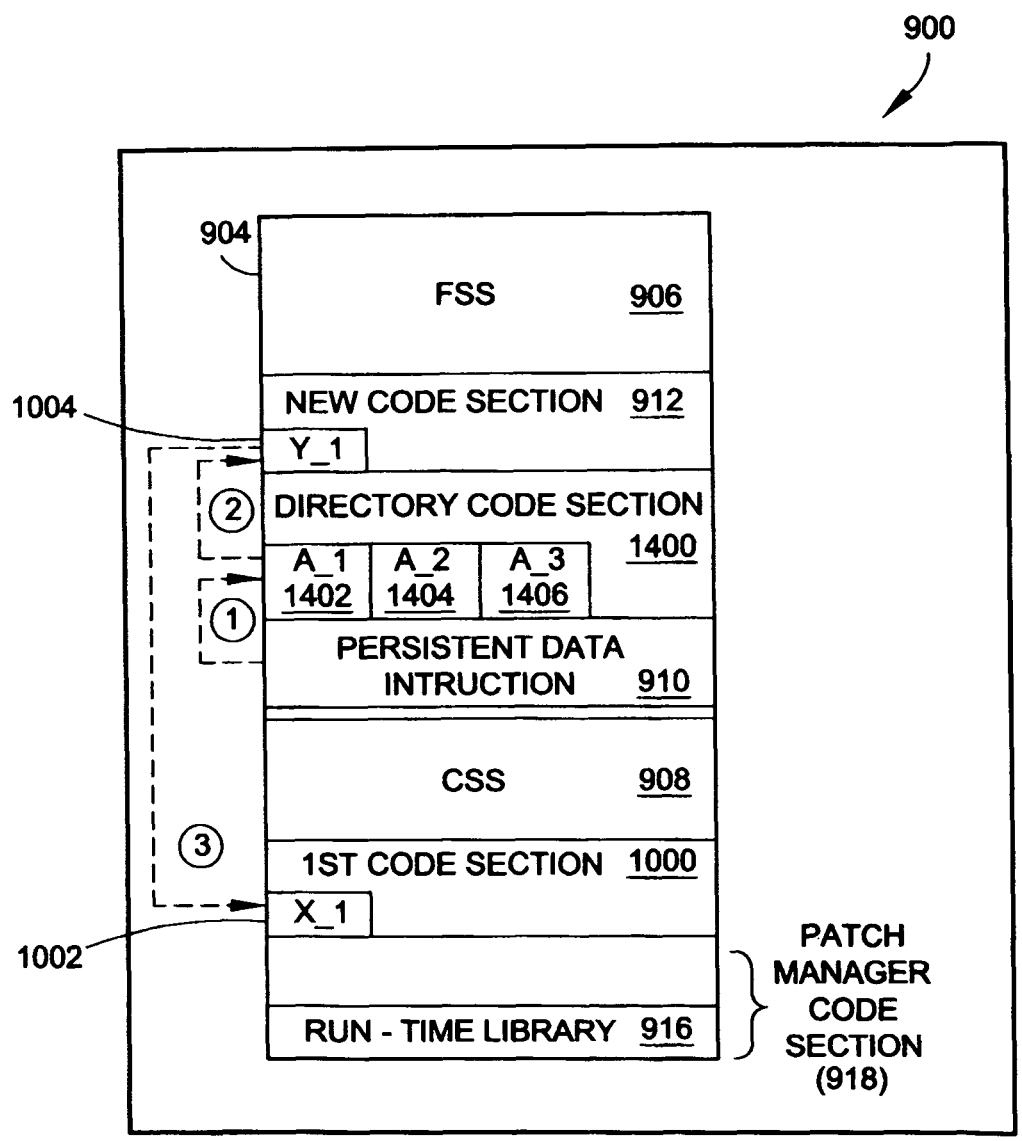
FIG. 14 is a schematic block diagram illustrating the directory aspect of the present invention system.

FIG. 14 is a schematic block diagram illustrating the directory aspect of the present invention system 900. The file system section 906 receives a directory code section 1400 with a plurality of data item addresses, such as A_1 (1402), A_2 (1404), and A_3 (1406). The persistent data instructions 910 locate replacement data items in response to directory code section data items addresses. The persistent data instructions 910 replace the persistent data items in the first code section 1000 with the located replacement data item. As shown, the persistent data instructions 910 use data item address A_1 (1402), see dotted arrow labeled "1". Address A_1 (1402) directs the persistent data instructions 910 to data item Y_1 (1004) in new code section 912, see dotted arrow label "2". Once located, data item X_1 (1002) in the first code section 1000 is replaced with data item Y_1 (1004), see dotted arrow label "3".

In a more complex variation of the directory process, the file system section 906 receives conditional persistent data instructions, represented as reference designator 910, and a directory code section 1400 with a plurality of constraint addresses, represented as A_1 (1402), A_2 (1404), and A_3 (1406). The conditional persistent data instructions 910 locate constraint data items using the constraint addresses in the directory code section 1400. Then, the conditional persistent data instructions 910 compare the persistent data items in the first code section 1000 with constraints located using the constraint addresses. In response to comparing, the conditional persistent data instructions 910 replace the persistent data items in the first code section 1000. For example (not shown), the conditional persistent data instructions 910 use address A_1 (1402) to locate constraint Y_1 (1004) in the new code section 912. Then, in a manner similar to the description of FIG. 13 above, the conditional persistent data instructions 910 perform a conditional logic or mathematic operation using the constraint Y_1 (1004). Again, as above, the replacing data item may be a simple replacement value or generated as a result of a calculation. Although the first code section is shown located in code storage section 908, it should also be understood that the first code section could alternately be located in the file system section 906 and that the directory aspect of the present invention system can update persistent data items in the file system section 906 of permanent memory 904.

As mentioned earlier, one important use of the invention is to update data items that support RF calibration operations. Referring to FIG. 9, the system software includes RF calibration data items arranged in the first code section 1000. The RF calibration data items are used for functions such as frequency adjustment, amplifier biasing, attenuator adjustments, and temperature adjustments, to name but a few possibilities. Then, the file system section 906 receives a patch manager run time instruction 914 with at least one updated RF calibration data item. Typically, the updating of persistent data involves the receipt of more than one updated data item, and the replacement of more than more data item. As noted above, the data item may be updated by a variety of means (replacement, conditional, directory, or combinations of the three) associated with the PMRTI 914. Generally stated then, the persistent data instructions 910 can be said to reference the updated RF calibration data items in patch manager run time instruction 914 when replacing RF calibration data items in the first code section 1000.

In some aspects of the invention the file system section 906 receives a patch manager run time instruction 914 with at least one updated nonvolatile system and user configuration data item. Again, there can be a number of data item sources. The system software includes nonvolatile system and user configuration data items arranged in the first code section 1000 for functions such as system configuration files for identifying the wireless device's home region, identifying permissible roaming regions, identifying if the wireless device operates in digital and analog modes and, identifying the wireless device's preferred operating mode. The persistent data instructions 910 reference the updated nonvolatile system and user configuration data items in the patch manager run time instruction 914 when replacing nonvolatile system and user configuration data items in the first code section 1000. The data 110 items are updated using a replacement process, conditional logic operations, or a directory process.

In some aspects of the invention the file system section 906 receives a patch manager run time instruction 914 with at least one updated nonvolatile system and user application data item. The system software includes nonvolatile system and user application data items arranged in the first code section 1000 for functions such as managing phonebook files and managing calendar scheduling files. The persistent data instructions 910 reference the updated nonvolatile system and user application data items in the patch manager run time instruction 914 when replacing nonvolatile system and user application data items in the first code section 1000. As explained above, the nonvolatile system and user application data items are updated using a replacement process, conditional logic operations, a directory process, or combinations of these basic processes.

In some aspects of the invention, the file system section 906 receives a patch manager run time instruction 914 with at least one updated resource data item. The system software includes resource data items arranged in the first code section 1000 for user interface dialogues, user interface menus, and user interface languages. The persistent data instructions 910 reference the updated resource data items in the patch manager run time instruction 914 when replacing resource data items in the first code section 1000. The resource data items are updated using a replacement process, conditional logic operations, a directory process, or combinations of these basic processes.

Figure 15A:
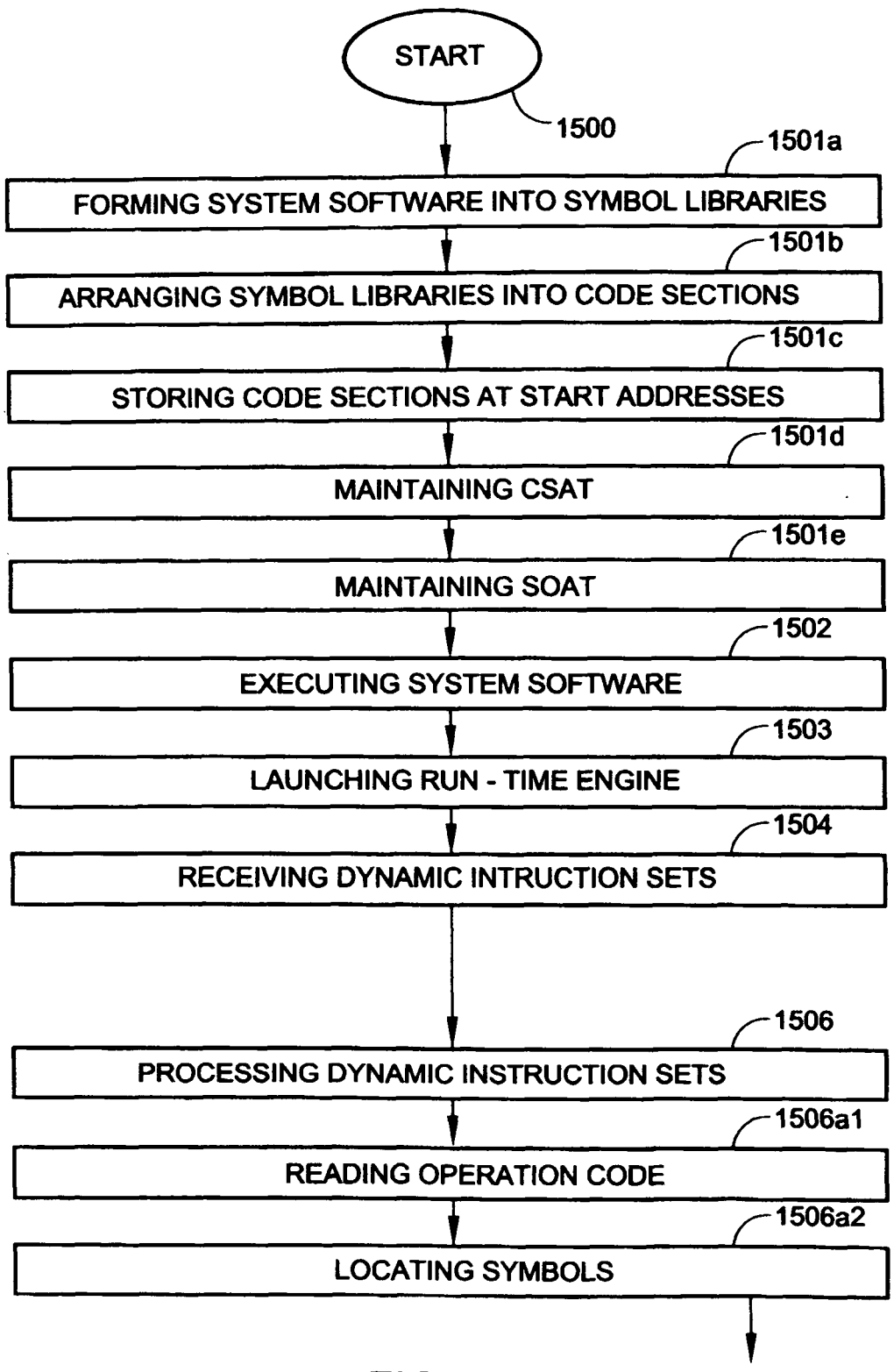
FIGS. 15a and 15b are flowcharts illustrating the present invention method for executing dynamic instruction sets in a wireless communications device.
Figure 15B:
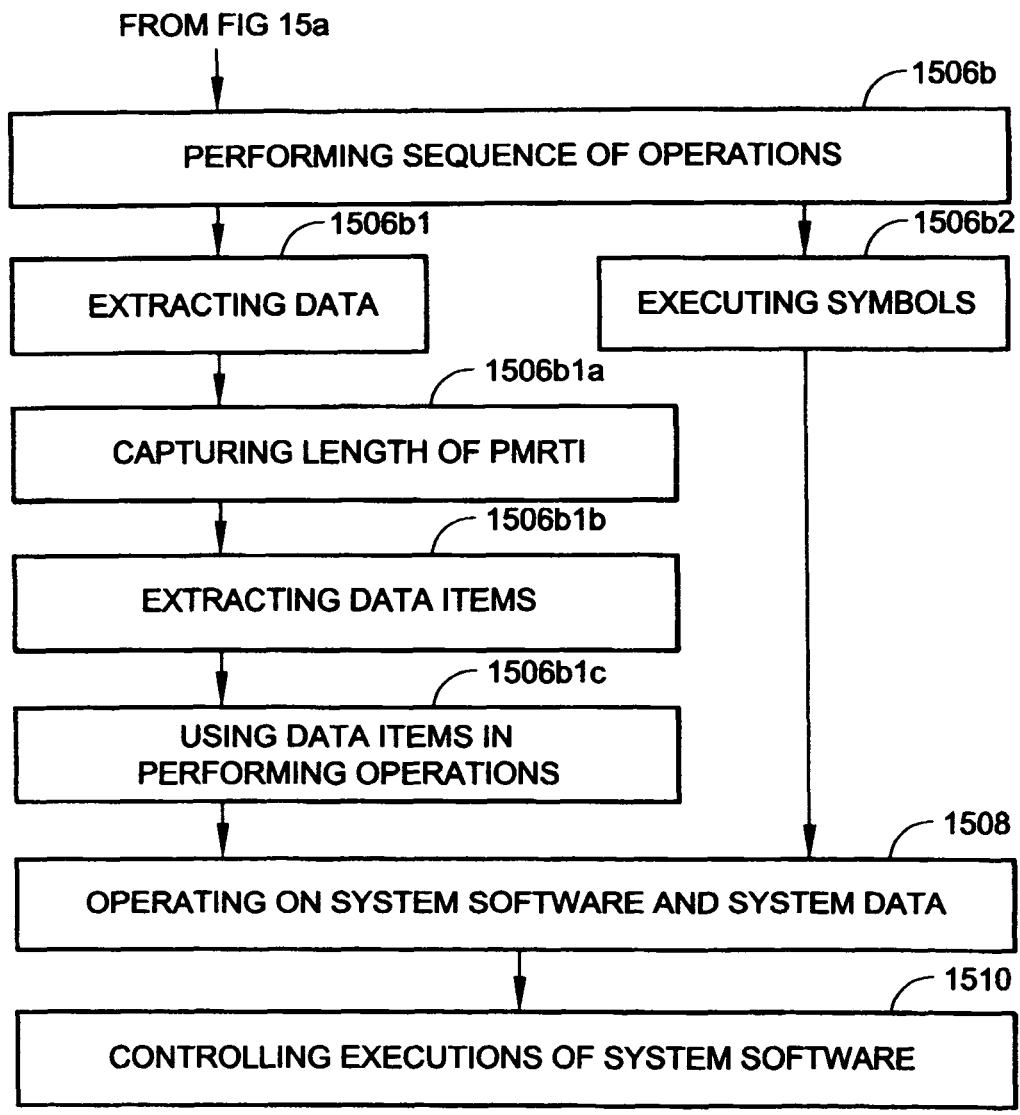

FIGS. 15a and 15b are flowcharts illustrating the present invention method for executing dynamic instruction sets in a wireless communications device. Although depicted as a sequence of numbered steps for clarity, no order should be inferred from the numbering (and the numbering in the methods presented below) unless explicitly stated. The method starts at Step 1500. Step 1501a forms the system software into symbol libraries, each symbol library comprising symbols having related functionality. Step 1501b arranges the symbol libraries into code sections. Step 1502 executes system software. Step 1503 launches a run-time engine. Typically, launching a run-time engine includes invoking a runtime library from a first code section. The run-time engine can be launched from either volatile or nonvolatile memory. Step 1504, following Step 1503, receives the dynamic instruction sets. Receiving the dynamic instruction sets in Step 1504 includes receiving the dynamic instruction sets through an interface selected from the group including airlink, radio frequency (RF) hardline, installable memory module, infrared, and logic port interfaces. In some aspects of the invention, receiving the dynamic instruction set in Step 1504 includes receiving a patch manager run time instruction (PMRTI) in a file system section nonvolatile memory.

Step 1506 processes dynamic instruction sets. Processing dynamic instruction sets includes processing instructions in response to mathematical and logical operations. In some aspects of the invention, Step 1507 (not shown), following the processing of the dynamic instruction sets, deletes dynamic instruction sets. Step 1508 operates on system data and system software. Step 1510, in response to operating on the system data and system software, controls the execution of the system software.

Typically, receiving the patch manager run time instructions in Step 1504 includes receiving conditional operation code and data items. Then, processing dynamic instruction sets in Step 1506 includes substeps. Step 1506a1 uses the run-time engine to read the patch manager run time instruction operation code. Step 1506b performs a sequence of operations in response to the operation code.

In some aspects, arranging the symbol libraries into code sections in Step 1501b includes starting symbol libraries at the start of code sections and arranging symbols to be offset from their respective code section start addresses. Then the method comprises further steps. Step 1501c stores the start of code sections at corresponding start addresses. Step 1501d maintains a code section address table (CSAT) cross-referencing code section identifiers with corresponding start addresses. Step 1501e maintains a symbol offset address table (SOAT) cross-referencing symbol identifiers with corresponding offset addresses, and corresponding code section identifiers.

In some aspects of the invention, receiving the patch manager run time instruction in Step 1504 includes receiving symbol identifiers. Then, the method comprises a further step. Step 1506a2 locates symbols corresponding to the received symbol identifiers by using the code section address table and symbol offset address table. Performing a sequence of operations in response to the operation code in Step 1506b includes substeps. Step 1506b1 extracts the data when the located symbols are data items. Step 1506b2 executes the symbols when the located symbols are instructions.

In some aspects of the invention, processing dynamic instruction sets in Step 1506b1 includes additional substeps. Step 1506b1a uses the run-time engine to capture the length of the patch manager run time instruction. Step 1506b1b extracts the data items from the patch manager run time instruction, in response to the operation code. Step 1506b1c uses the extracted data in performing the sequence of operations responsive to the operation code.

Figure 16:
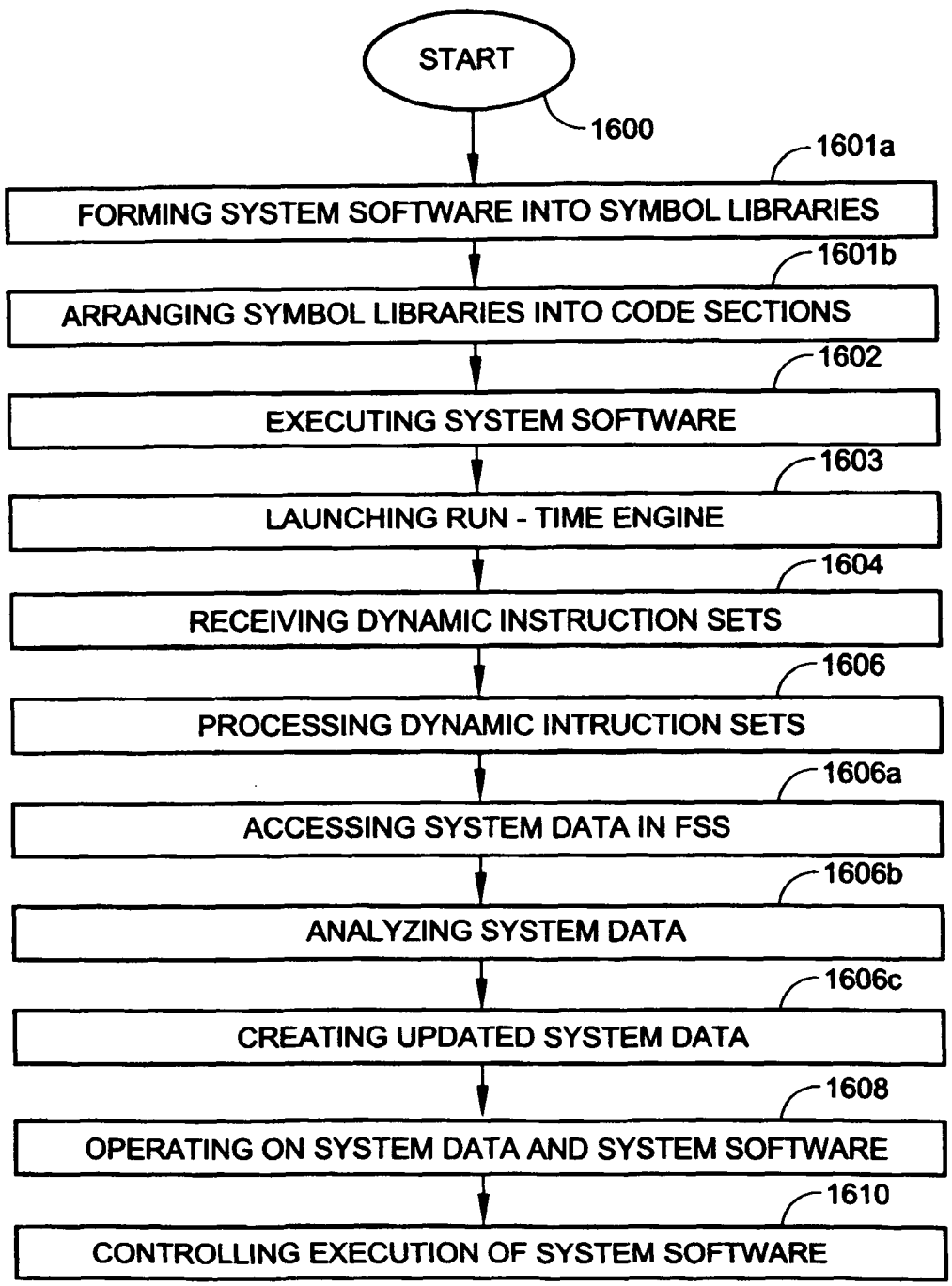
FIG. 16 is a flowchart illustrating an exemplary dynamic instruction set operation.

FIG. 16 is a flowchart illustrating an exemplary dynamic instruction set operation. Several of the Steps in FIG. 16 are the same as in FIG. 15, and are not repeated here in the interest of brevity. Processing dynamic instruction sets in Step 1606 includes substeps. Step 1606a accesses system data stored in a second code section in the file system section. Step 1606b analyzes the system data. Step 1606c creates updated system data. Then, operating on system data and system software in Step 1608 includes replacing the system data in the second section with the updated system data, and controlling the execution of the system software in Step 1610 includes using the updated system data in the execution of the system software.

Figure 17:
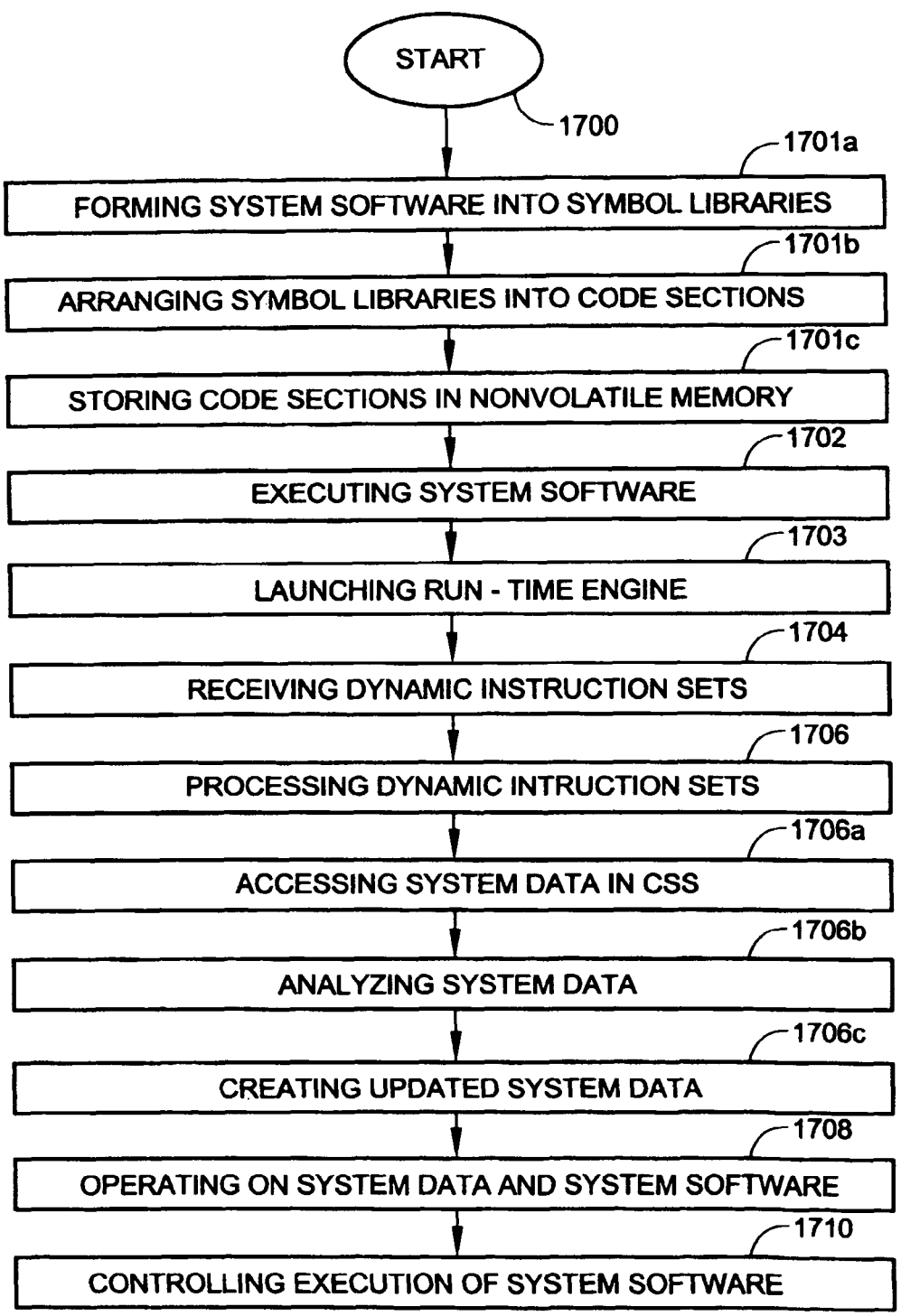
FIG. 17 is a flowchart illustrating another exemplary dynamic instruction set operation.

FIG. 17 is a flowchart illustrating another exemplary dynamic instruction set operation. Several of the Steps in FIG. 17 are the same as in FIG. 15, and are not repeated here in the interest of brevity. Step 1701c stores a plurality of code sections in a code storage section nonvolatile memory. Processing dynamic instruction sets in Step 1706 includes substeps. Step 1706a accesses system data stored in a third code section in the code storage section (CSS). Step 1706b analyzes the system data. Step 1706c creates updated system data. Operating on the system data and system software in Step 1708 includes replacing the system data in the third code section with the updated system data. Controlling the execution of the system software in Step 1710 includes using the updated system data in the execution of the system software.

Figure 18:
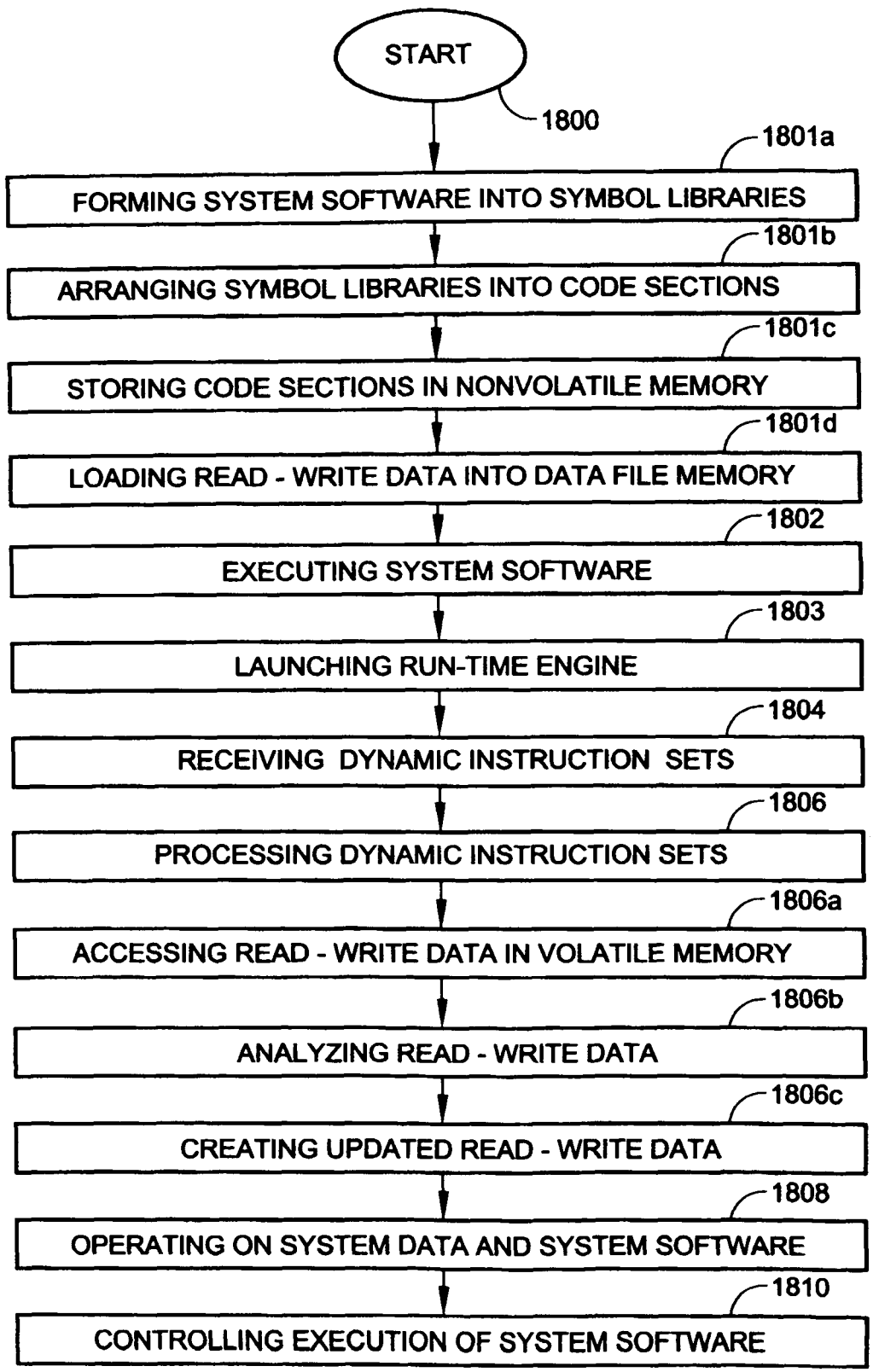
FIG. 18 is a flowchart illustrating a third exemplary dynamic instruction set operation.

FIG. 18 is a flowchart illustrating a third exemplary dynamic instruction set operation. Several of the Steps in FIG. 18 are the same as in FIG. 15, and are not repeated here in the interest of brevity. Step 1801c stores a plurality of code sections in a code storage section nonvolatile memory. Step 1801d loads read-write data into volatile memory. Processing dynamic instruction sets in Step 1806 includes substeps. Step 1806a accesses the read-write data in volatile memory. Step 1806b analyzes the read-write data. Step 1806c creates updated read-write data. Operating on the system data and system software in Step 1808 includes replacing the read-write data in volatile memory with the updated read-write data. Controlling the execution of the system software in Step 1810 includes using the updated read-write data in the execution of the system software.

Figure 19:
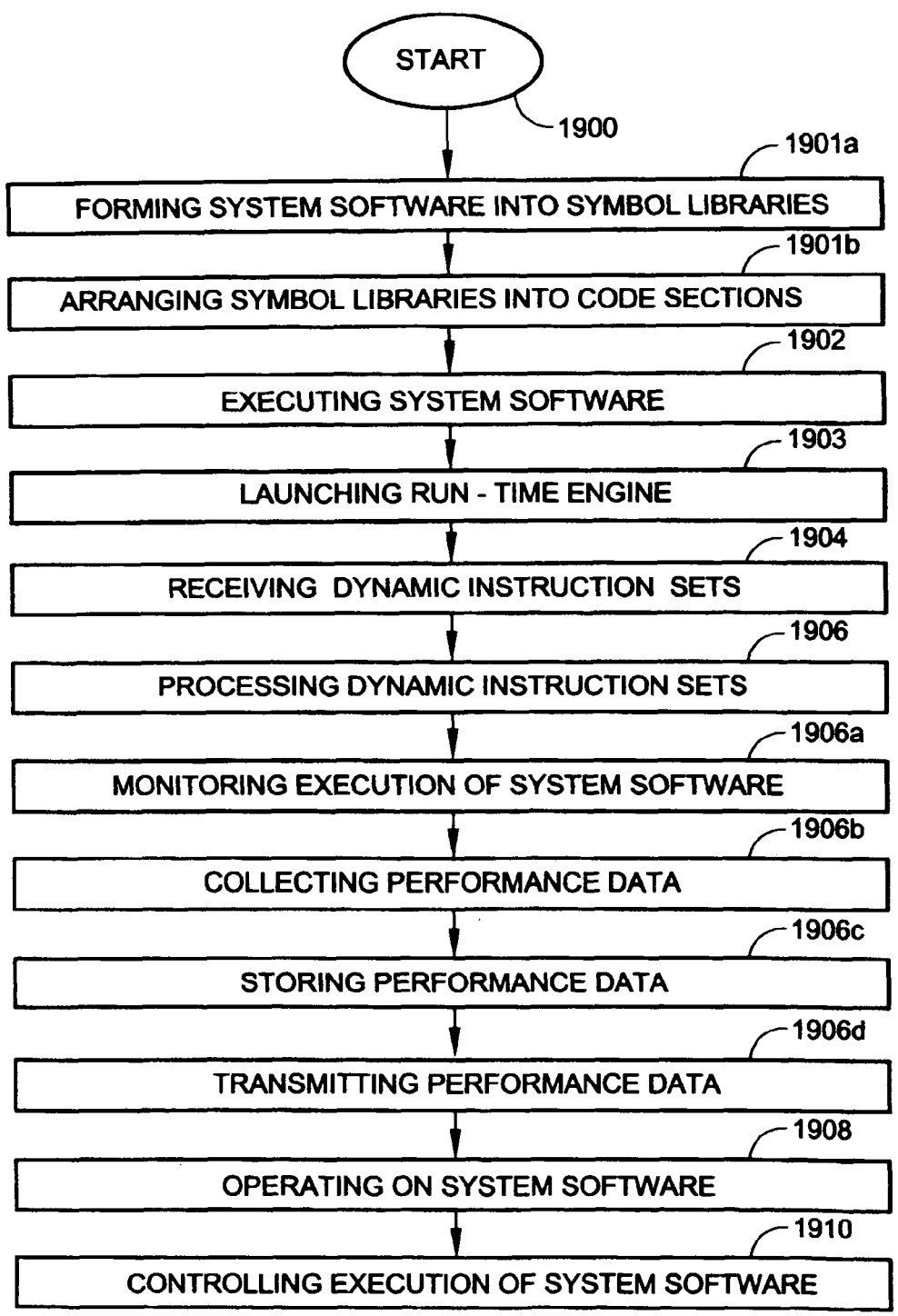
FIG. 19 is a flowchart illustrating a fourth exemplary dynamic instruction set operation.

FIG. 19 is a flowchart illustrating a fourth exemplary dynamic instruction set operation. Several of the Steps in FIG. 19 are the same as in FIG. 15, and are not repeated here in the interest of brevity. Processing dynamic instruction sets includes substeps. Step 1906a, in response to the operation code, monitors the execution of the system software. Step 1906b collects performance data. Step 1906c stores the performance data. Step 1906d transmits the stored data via an airlink interface. Operating on the system data and system software in Step 1908 includes using the performance data in the evaluation of system software. Step 1910 controls the execution of the system software.

Figure 20:
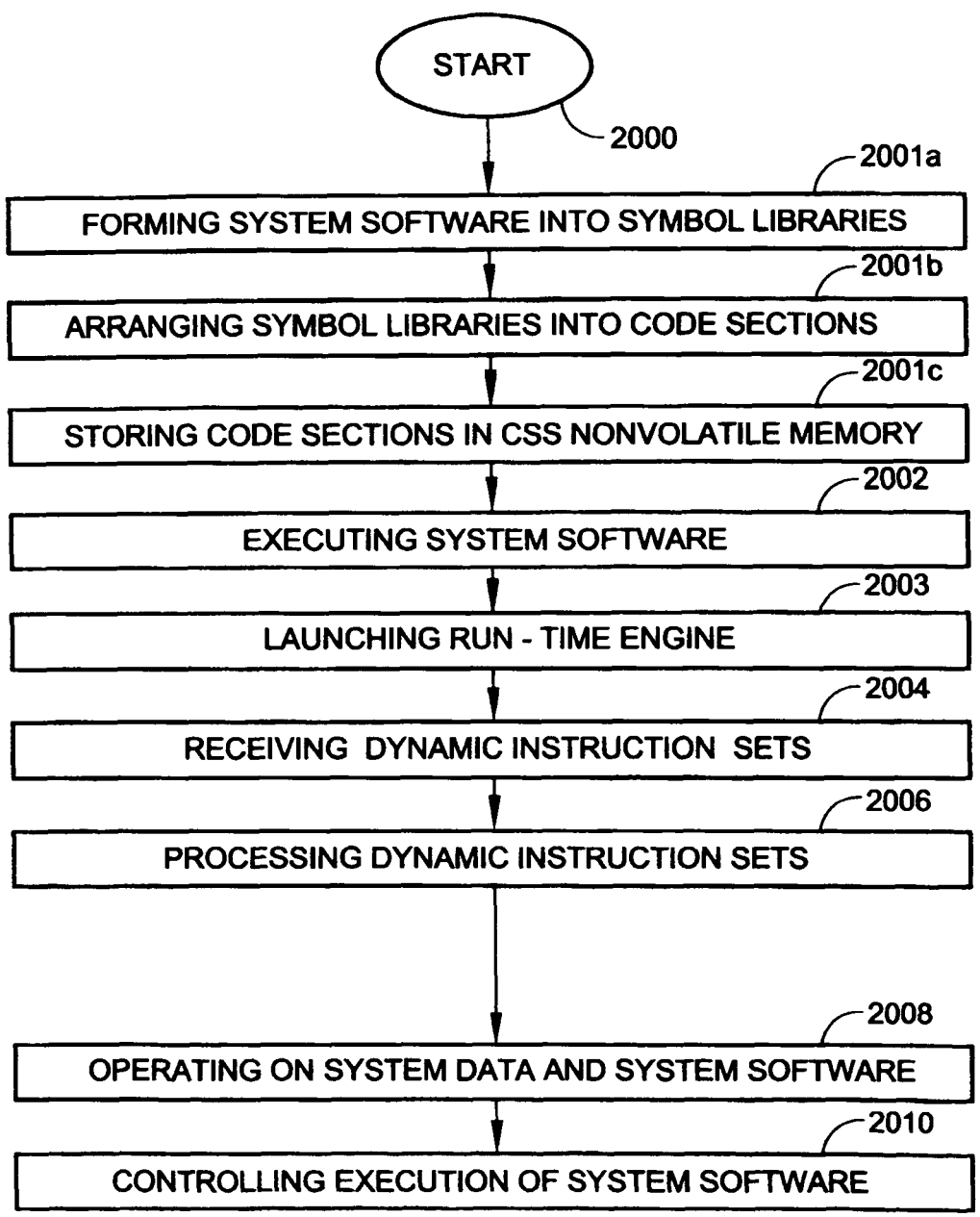
FIG. 20 is a flowchart illustrating a fifth exemplary dynamic instruction set operation.

FIG. 20 is a flowchart illustrating a fifth exemplary dynamic instruction set operation. Several of the Steps in FIG. 20 are the same as in FIG. 15, and are not repeated here in the interest of brevity. Step 2001c stores a plurality of code sections in a code storage section nonvolatile memory. Receiving patch manager run time instructions in Step 2003 includes receiving a new code section. Operating on the system data and system software in Step 2008 includes adding the new code section to the code storage section, and controlling the execution of the system software in Step 2010 includes using the new code section in the execution of the system software.

Alternately, receiving a new code section in Step 2003 includes receiving an updated code section. Then, operating on the system data and system software in Step 2008 includes replacing a fourth code section in the code storage section with the updated code section.

Figure 21:
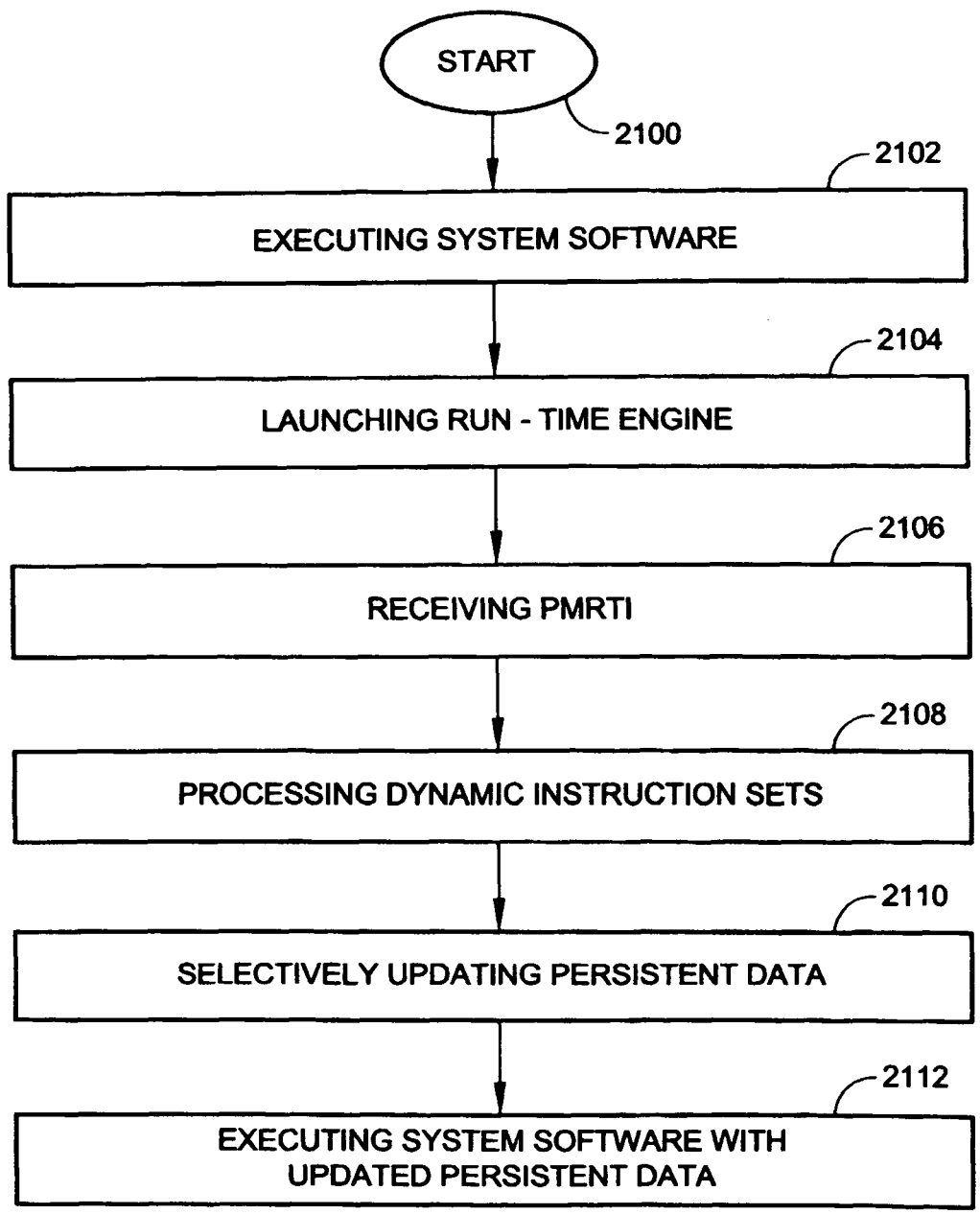
FIG. 21 is a flowchart illustrating the present invention method for updating persistent data in the system software of a wireless communications device.

FIG. 21 is a flowchart illustrating the present invention method for updating persistent data in the system software of a wireless communications device. The method starts at Step 2100. As described in detail above and, therefore not specifically shown in the figure, Step 2101a forms the system software into symbol libraries, each symbol library comprising symbols having related functionality. Step 2101b arranges the symbol libraries into code sections in nonvolatile memory (in either the code storage section of the file system section). Step 2102 executes system software. Step 2104 launches a run-time engine. Step 2106 receives patch manager run time instructions with dynamic instruction sets and new code sections, including updated persistent data, in a file system section in nonvolatile memory. Step 2108 processes dynamic instruction sets. Step 2110, in response to processing the dynamic instruction sets, selectively updates persistent data in the system software.

Updating persistent data in the system software in Step 2110 includes updating persistent data such as radio frequency (RF) calibration data, nonvolatile system and user configuration data, resource data, nonvolatile system and user application data, and arbitrary data. One point of novelty (among many) in the present invention is the ability to replace some of the data items in a section of system software without the requirement of performing a bulk replacement of all the data items. Step 2112 executes the system software with the updated persistent data.

Figure 22:
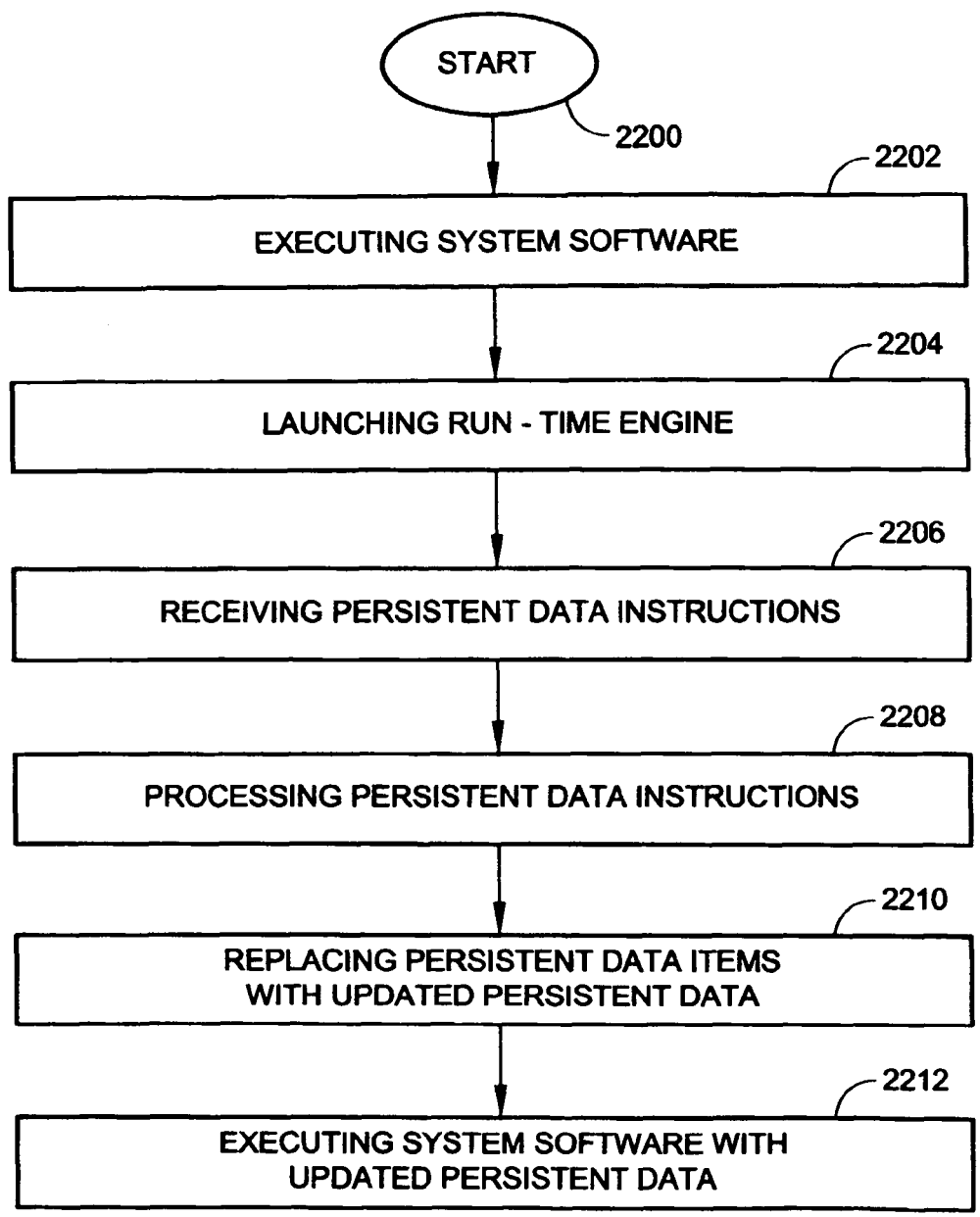
FIG. 22 is a flowchart substantially the same as FIG. 21, featuring the replacement data item updating process.

FIG. 22 is a flowchart substantially the same as FIG. 21, featuring the replacement data item updating process. Most of the steps in FIG. 22 are the same as the steps in FIG. 21, and they are not explained in the interest of brevity. Receiving dynamic instruction sets in Step 2206 includes receiving persistent data instructions, and arranging symbol libraries into code sections in Step 2201b (not shown) includes arranging a plurality of persistent data items in a first code section. Then, updating persistent data in Step 2210 includes replacing persistent data items in the first code section with updated persistent data items, in response to the persistent data instructions.

In some aspects, receiving updated persistent data in a file system section in nonvolatile memory in Step 2206 includes receiving a replacement code section with a plurality of data items. Then, replacing persistent data items in the first code section with updated persistent data items (Step 2210), in response to the persistent data instructions, includes replacing the persistent data items in the first code section with the data items from the replacement code section.

In some aspects, receiving persistent data instructions in Step 2206 includes receiving replacement data items embedded with the persistent data instructions. Then, replacing persistent data items in the first code section with updated persistent data items (Step 2210), in response to the persistent data instructions, includes replacing the persistent data items in the first code section with the data items embedded in the persistent data instructions.

Figure 23:
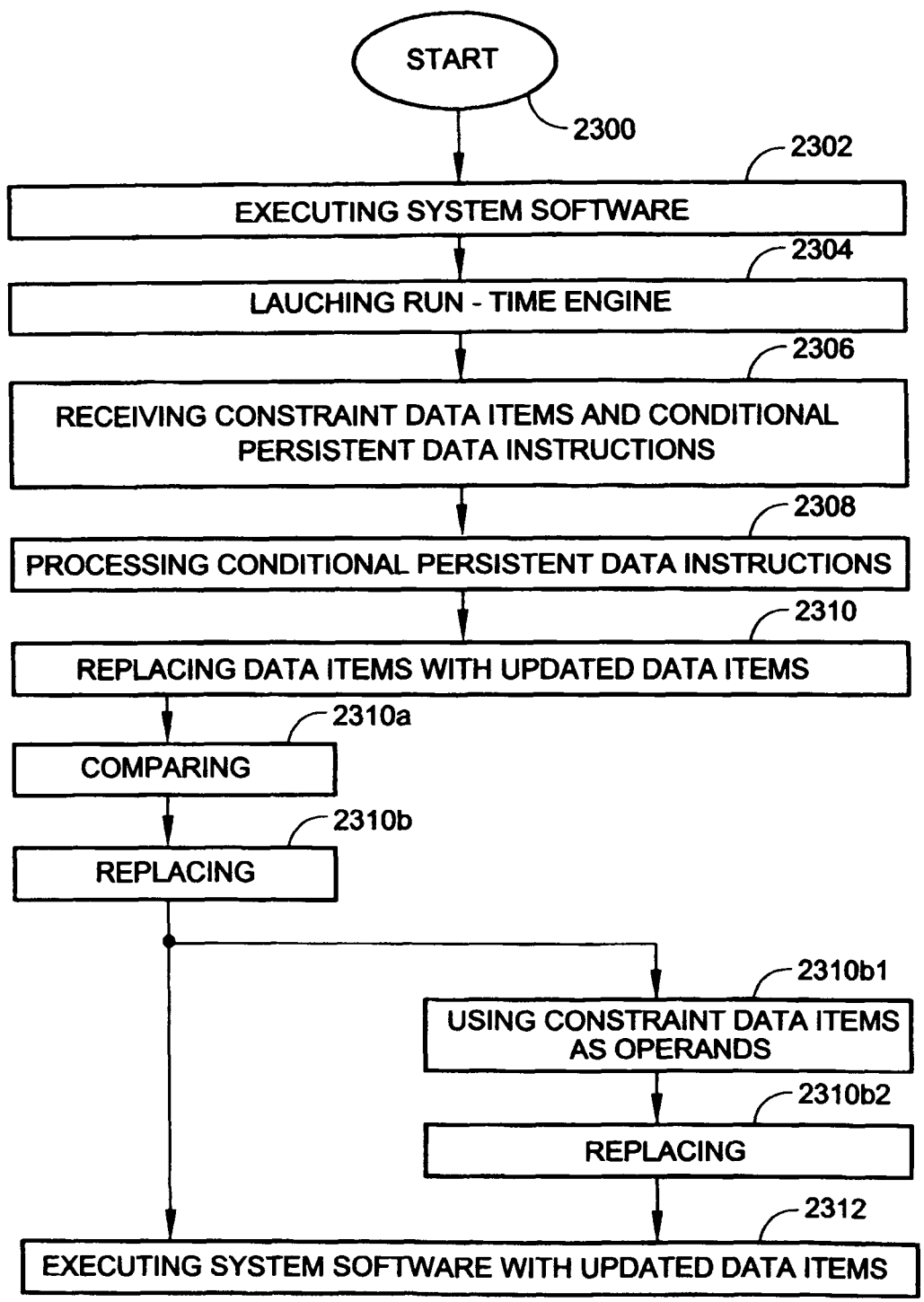
FIG. 23 is a flowchart substantially the same as FIG. 21, featuring the conditional logic data item updating process.

FIG. 23 is a flowchart substantially the same as FIG. 21, featuring the conditional logic data item updating process. Most of the steps in FIG. 23 are the same as the steps in FIG. 21, and they are not explained in the interest of brevity. Receiving updated persistent data in a file system section in nonvolatile memory in Step 2306 includes receiving a plurality of constraint data items and conditional persistent data instructions. Then, replacing persistent data items in the first code section with updated persistent data items (Step 2310), in response to the conditional persistent data instructions, includes substeps. Step 2310a, using the conditional persistent data instructions, compares the persistent data items in the first code section with the constraint data items. Step 2310b, in response to comparing, replaces the persistent data items in the first code section.

In some aspects, receiving updated persistent data in a file system section in nonvolatile memory in Step 2306 includes receiving a constraint code section with a plurality of data items. Then, replacing the persistent data items in the first code section (Step 2310b), in response to comparing, includes replacing persistent data items in the first code section with data items from the constraint code section.

In some aspects, receiving conditional persistent data instructions in Step 2306 includes receiving constraint data items embedded with the conditional persistent data instructions. Then, replacing the persistent data items in the first code section (Step 2310b), in response to comparing, includes replacing persistent data items in the first code section with constraint data items embedded in the conditional persistent data instructions.

In some aspects of the invention, replacing the persistent data items in the first code section (Step 2310b), in response to comparing, includes replacing persistent data items in the first code section with data items calculated by the conditional persistent data instructions. In other aspects, replacing the persistent data items in the first code section (Step 2310b), in response to comparing, includes substeps. Step 2310b1 uses the constraint data items as operands in calculations performed by the conditional persistent data instructions to create data item products. Step 2310b2 replaces persistent data items in the first code section with the data item products.

Figure 24:
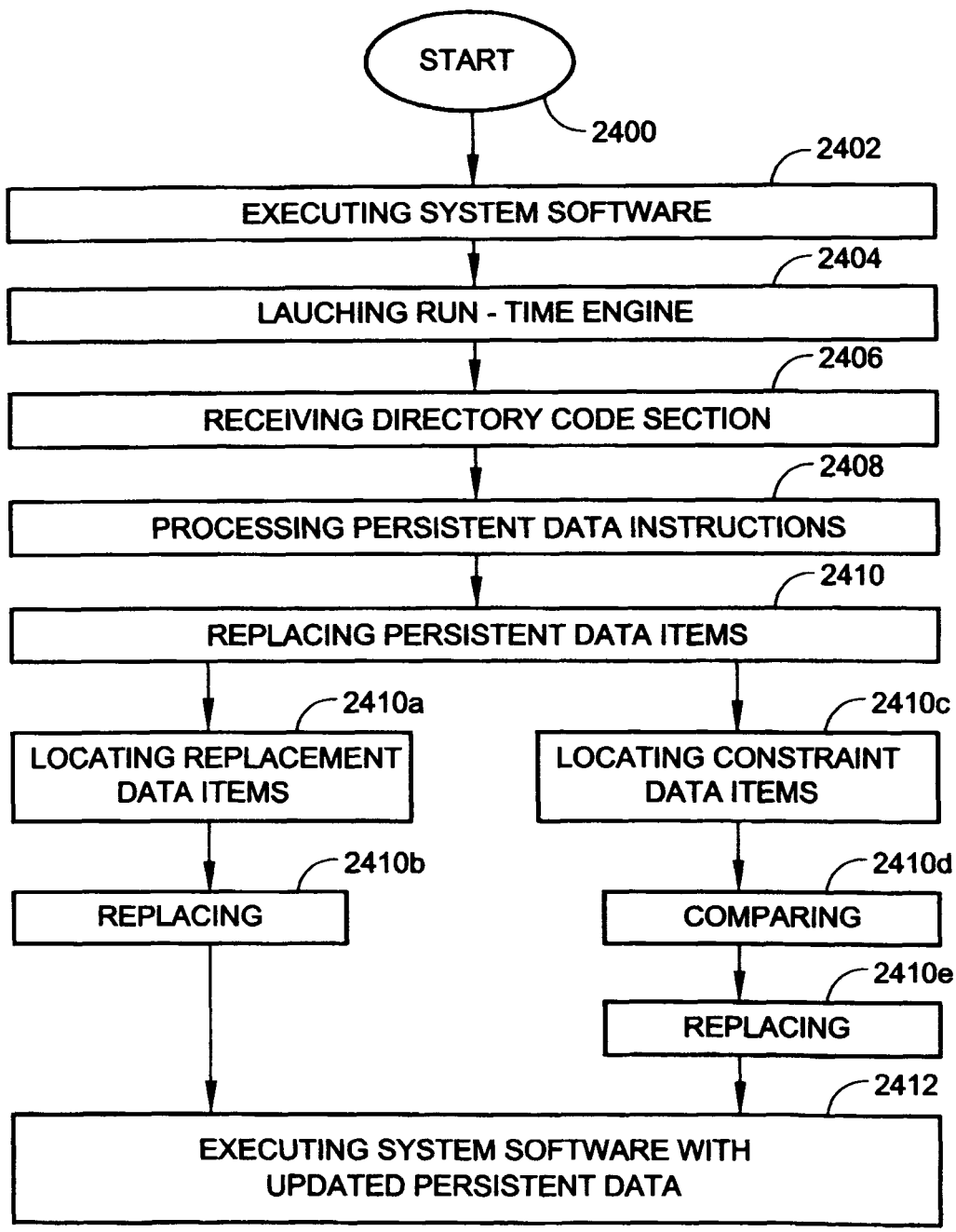
FIG. 24 is a flowchart substantially the same as FIG. 21, featuring the directory data item updating process.

FIG. 24 is a flowchart substantially the same as FIG. 21, featuring the directory data item updating process. Most of the steps in FIG. 24 are the same as the steps in FIG. 21, and they are not explained in the interest of brevity. Receiving updated persistent data in a file system section in nonvolatile memory in Step 2406 includes receiving a directory code section with a plurality of data item addresses. Then, replacing persistent data items in the first code section with updated persistent data items (Step 2410), in response to the persistent data instructions, includes substeps. Step 2410a locates replacement data items in response to directory code section data items addresses. Step 2410b replaces the persistent data items in the first code section with the located replacement data item.

In some aspects, receiving updated persistent data in a file system section in nonvolatile memory in Step 2406 includes receiving a directory code section with a plurality of constraint addresses. Then, replacing persistent data items in the first code section with persistent data items (Step 2410), in response to the persistent data instructions, includes substeps. Step 2410c locates constraint data items using the constraint addresses in the directory code section. Step 2410d, using the conditional persistent data instructions, compares the persistent data items in the first code section with constraints. Step 2410e, in response to comparing, replaces the persistent data items in the first code section.

Returning to FIG. 21, receiving updated persistent data in Step 2106 includes receiving updated persistent data through an interface selected from the group including airlink, wireless communications device keyboard, installable memory module, infrared, logic port, and RF hardline interfaces.

In some aspects, receiving updated persistent data in Step 2106 includes receiving a patch manager run time instruction with at least one updated RF calibration data item. Arranging symbol libraries into code sections in Step 2101b (not shown) includes arranging RF calibration data items in a first code section, and executing the system software in Step 2102 includes using the RF calibration data from the first code section for functions including, but not limited to, frequency adjustment, amplifier biasing, attenuator adjustments, and temperature adjustments. Then, updating the persistent data in the system software 2110 includes referencing the updated RF calibration data items in the patch manager run time instruction when replacing RF calibration data items in the first code section. As shown above, the updated data items are referenced in using the replacement, conditional logic, or directory updating processes.

In some aspects of the invention, receiving updated persistent data in Step 2106 includes receiving a patch manger run time instruction with at least one updated nonvolatile system and user configuration data item. Arranging symbol libraries into code sections in Step 2101b (not shown) includes arranging nonvolatile system and user configuration data items in a first code section. Executing the system software in Step 2102 includes using the nonvolatile system and user configuration data items from the first code section for functions including, but not limited to, system configuration files for identifying the wireless device's home region, identifying permissible roaming regions, identifying if the wireless device operates in digital and analog modes and, identifying the wireless device's preferred operating mode. Then, updating the persistent data in the system software in Step 2110 includes referencing the updated nonvolatile system and user configuration data items in patch manager run time instruction when replacing nonvolatile system and user configuration data items in the first code section.

In some aspects, receiving updated persistent data in Step 2106 includes receiving a patch manager run time instruction with at least one updated nonvolatile system and user application data item. Arranging symbol libraries into code sections in Step 2101b (not shown) includes arranging nonvolatile system and user application data items in a first code section. Executing the system software in Step 2102 includes using the nonvolatile system and user application data items from the first code section for functions including, but not limited to, managing phonebook files and managing calendar scheduling files. Then, updating the persistent data in the system software in Step 2110 includes referencing the updated nonvolatile system and user application data items in the patch manager run time instruction when replacing nonvolatile system and user application data items in the first code section.

In some aspects, receiving new code sections in Step 2106 includes receiving a patch manager run time instruction with at least one updated resource data item. Arranging symbol libraries into code sections in Step 2101b (not shown) includes arranging resource data items in a first code section. Executing the system software in Step 2102 includes using the resource data from the first code section for functions including, but not limited to, user interface dialogues, user interface menus, and user interface languages. Updating the persistent data in the system software in Step 2110 includes referencing the updated resource data items in the patch manager run time instruction when replacing resource data items in the first code section.

A system and method have been provided for executing dynamic instruction sets in a wireless communications device, so as to aid in the updating and fixing of system software problems. The system is easily updateable because of the arrangement of symbol libraries in code sections, with tables to access the start addresses of the code sections in memory and the offset addresses of symbols in the symbol libraries. The use of dynamic instruction sets permits custom modifications to be performed to each wireless device, based upon specific characteristics of that device. A few general examples have been given illustrating possible uses for the dynamic instructions sets in updating system software persistent data. However, the present invention is not limited to just these examples. Other variations and embodiments of the invention will occur to those skilled in the art.

We claim:
1. In a wireless communications device, a method for updating data, the method comprising:
   executing system software;

receiving an instruction set, having instructions and data items, from an air interface, at least one of the instructions including an operation code that specifies an operation to be performed using at least one data item extracted from the instruction set;

launching a run-time engine;

processing the instruction set;

replacing data items in the system software with updated data items, in response to the instructions including:
 using the at least one data item extracted from the instruction set to perform the operation specified by the operation code; and
 replacing the data items with a result of the operation; and executing the system software with the updated data items in response to the instructions.

2. The method of claim 1 further comprising:
 executing the system software with the replaced data items.

3. The method of claim 2 wherein replacing data items in the system software includes replacing data items selected from the group including radio frequency (RF) calibration data, nonvolatile system and user configuration data, resource data, nonvolatile system and user application data, and arbitrary data.

4. The method of claim 1 further comprising:
 forming the system software into symbol libraries, each symbol library comprising symbols having related functionality;
 arranging the symbol libraries into code sections in nonvolatile memory; and
 wherein the step of receiving the instruction set comprises receiving the instruction set in a file system section in nonvolatile memory.

5. The method of claim 1 wherein receiving the instruction set includes receiving instructions; and
 wherein replacing data items includes replacing data items with updated data items, and using the instructions.

6. The method of claim 5, wherein the step of receiving the instruction set comprises receiving in a file system section in nonvolatile memory a replacement code section with a plurality of replacement data items; and
 wherein replacing data items with updated data items, in response to the instructions, includes replacing the data items with the replacement data items from the replacement code section.

7. The method of claim 5 wherein receiving data instructions includes receiving the replacement data items embedded with the instructions; and
 wherein replacing data items with replacement data items, in response to the instructions, includes replacing the data items with the replacement data items embedded in the instructions.

8. The method of claim 6 wherein receiving replacement data items in a file system section in nonvolatile memory includes receiving a plurality of data items and instructions;
 wherein replacing data items with updated data items, in response to the instructions, includes:
 using the instructions, comparing the data items received with the instructions; and
 in response to comparing, replacing the data items.

9. The method of claim 8 wherein receiving updated data includes receiving a code section with a plurality of data items; and
 wherein replacing the data items, in response to comparing, includes replacing data items with data items from the code section.

10. The method of claim 8 wherein receiving instructions includes receiving data items embedded with the instructions;
 wherein replacing the data items, in response to comparing, includes replacing data items with data items embedded in the instructions.

11. The method of claim 8 wherein replacing the data items, in response to comparing, includes replacing data items with calculated data items, the calculated data items having been calculated responsive to the instructions.

12. The method of claim 8 wherein replacing the data items, in response to comparing, includes:
 using the data items as operands in calculations performed by the instructions to create data item products; and
 replacing data items with the data item products.

13. The method of claim 5 wherein receiving updated data includes receiving a directory code section with a plurality of data item addresses;
 wherein replacing data items with updated data items, in response to the instructions, includes:
 locating a replacement data item in response to directory code section data items addresses; and
 replacing the data items with the located replacement data item.

14. The method of claim 5 wherein receiving updated data items includes receiving a directory code section with a plurality of addresses;
 wherein replacing data items with replacement data items, in response to the instructions, includes:
 locating data items using the addresses in the directory code section; and
 using the instructions, comparing the data items with data items associated with the addresses; and
 in response to comparing, replacing the data items.

15. The method of claim 5 wherein receiving updated data items includes receiving a patch manager run time instruction with at least one updated RF calibration data item;
 wherein executing the system software includes using the RF calibration data for functions selected from the group including frequency adjustment, amplifier biasing, attenuator adjustments, and temperature adjustments; and
 wherein replacing the data items in the system software includes referencing the updated RF calibration data items in the patch manager run time instruction when replacing RF calibration data items.

16. The method of claim 5 wherein receiving updated data includes receiving a patch manger run time instruction with at least one updated nonvolatile system and user configuration data item;
 wherein executing the system software includes using the nonvolatile system and user configuration data items for functions selected from the group including system configuration files for identifying the wireless device's home region, identifying permissible roaming regions, identifying if the wireless device operates in digital and analog modes and, identifying the wireless device's preferred operating mode; and
 wherein replacing the data items in the system software includes referencing the updated nonvolatile system and user configuration data items in patch manager run time instruction when replacing nonvolatile system and user configuration data items.

17. The method of claim 5 wherein receiving updated data items includes receiving a patch manager run time instruction with at least one updated nonvolatile system and user application data item;
   wherein executing the system software includes using the nonvolatile system and user application data items for functions selected from the group including managing phonebook files and managing calendar scheduling files; and
   wherein replacing the data in the system software includes referencing the updated nonvolatile system and user application data items in the patch manager run time instruction when replacing nonvolatile system and user application data items in a first code section.

18. The method of claim 5 wherein receiving new code sections includes receiving a patch manager run time instruction with at least one updated resource data item;
   wherein executing the system software includes using the resource data for functions selected from the group including user interface dialogues, user interface menus, and user interface languages; and
   wherein replacing the data in the system software includes referencing the updated resource data items in the patch manager run time instruction when replacing resource data items in a first code section.

19. In a wireless communications device, a method for updating data, the method comprising:
   executing system software;
   launching a run-time engine;
   wirelessly receiving an instruction set, having instructions, data items, and a new code section, including an updated data item, at least one of the instructions including an operation code that specifies an operation to be performed using at least one data item extracted from the instruction set;
   processing the instruction set to selectively update data in the system software;
   replacing data items with updated data items, in response to the instructions including:
      using the at least one data item extracted from the instruction set to perform the operation specified by the operation code; and
      replacing the data items with a result of the operation; and
   executing the system software with the updated data items.

20. In a wireless communications device, a system for updating data, the system comprising:
   executable system software and system data differentiated into code sections stored in nonvolatile memory permanent storage;
   a transceiver including an antenna for receiving communications from an airlink interface;
   a processor connected to the transceiver, wherein the processor is configured to receive an instruction set having instructions and data items, from the airlink interface, at least one of the instructions including an operation code that specifies an operation to be performed using at least one data item extracted from the instruction set, and process the instruction set to selectively update data comprised of data items in the system software and to replace data items with updated data items, in response to the instructions by using the at least one data item extracted from the instruction set to perform the operation specified by the operation code, and to replace the data items with a result of the operation, where each data item is in a portion of a code section having at least one additional data item in the same code section that is not updated; and
   a run-time engine for processing the instruction sets.

21. The system of claim 20 wherein the executable system software and system data are updated in response to processing the instruction sets.

22. The system of claim 21 wherein the executable system software is formed into symbol libraries, each symbol library comprising symbols having related functionality, arranged into code sections stored in a code storage section;
   the system further comprising:
   a file system section of nonvolatile permanent memory for receiving patch manager run time instructions (PMRTIs) via the airlink interface, the patch manager run time instructions including instruction sets and new code sections.

23. The system of claim 22 wherein the instruction sets update data in the system software selected from the group including radio frequency (RF) calibration data, nonvolatile system and user configuration data, resource data, nonvolatile system and user application data, and arbitrary data.

24. The system of claim 23 wherein the system software is formed into symbol libraries, each symbol library comprising symbols having related functionality, and arranged into code sections in nonvolatile permanent memory; and
   wherein the file system section receives instruction sets and new code sections, including updated data.

25. The system of claim 21 further comprising a file system section configured to receive instruction sets including instructions;
   wherein the system software includes a plurality of data items; and
   wherein the instructions replace data items with updated data items.

26. The system of claim 25 wherein the file system section receives a replacement code section with a plurality of data items; and
   wherein the instructions replace the data items with the data items from the replacement code section.

27. The system of claim 25 wherein the file system section receives replacement data items embedded with the instructions; and
   wherein the instructions replace the data items with the data items embedded in the instructions.

28. The system of claim 25 wherein the file system section receives a plurality of data items and instructions;
   wherein the instructions compare the data items with the data items received with the instructions and
   in response to comparing the data items with the data items received with the instructions, replace the data items.

29. The system of claim 25 wherein the file system section receives a directory code section with a plurality of data item addresses;
   wherein the instructions locate replacement data items in response to directory code section data items addresses and replace the data items with the located replacement data item.

30. The system of claim 25 wherein the file system section receives instructions and a directory code section with a plurality of addresses;
   wherein the instructions locate data items using the addresses in the directory code section, compare the data items with the located data items associated with the addresses, and, in response to comparing, replace the data items.

31. The system of claim 25 wherein the file system section receives a patch manager run time instruction with at least one updated RF calibration data item;
    wherein the system software includes RF calibration data items for functions selected from the group including frequency adjustment, amplifier biasing, attenuator adjustments, and temperature adjustments; and
    wherein the instructions reference the updated RF calibration data items in patch manager run time instruction when replacing RF calibration data items.

32. The system of claim 25 wherein the file system section receives a patch manager run time instruction with at least one updated nonvolatile system and user configuration data item;
    wherein the system software includes nonvolatile system and user configuration data items for functions selected from the group including system configuration files for identifying the wireless device's home region, identifying permissible roaming regions, identifying if the wireless device operates in digital and analog modes and, identifying the wireless device's preferred operating mode; and
    wherein the instructions reference the updated nonvolatile system and user configuration data items in the patch manager run time instruction when replacing nonvolatile system and user configuration data items.

33. The system of claim 25 wherein the file system section receives a patch manager run time instruction with at least one updated nonvolatile system and user application data item;
    wherein the system software includes nonvolatile system and user application data items for functions selected from the group including managing phonebook files and managing calendar scheduling files; and
    wherein the instructions reference the updated nonvolatile system and user application data items in the patch manager run time instruction when replacing nonvolatile system and user application data items.

34. The system of claim 25 wherein the file system section receives a patch manager run time instruction with at least one updated resource data item;
    wherein the system software includes resource data items for functions selected from the group including user interface dialogues, user interface menus, and user interface languages; and
    wherein the instructions reference the updated resource data items in the patch manager run time instruction when replacing resource data items.

35. In a wireless communications device, a system for updating data, the system comprising:
    executable system software and system data differentiated into code sections stored in nonvolatile memory permanent storage and formed into symbol libraries, each symbol library comprising symbols having related functionality, arranged into code sections stored in a code storage section;
    dynamic instruction sets having data items and instructions for conditionally selecting data in the system software, the data comprising items selected from the group including radio frequency (RF) calibration data, nonvolatile system and user configuration data, resource data, nonvolatile system and user application data, and arbitrary data and where each data item resides in a portion of a code section having at least one additional data item that is not updated in the same code section, at least one of the instructions including an operation code that specifies an operation to be performed using at least one data item extracted from at least one of the instruction sets;
    a run-time engine for processing the instruction sets for selectively replacing the selected data items in the system software with updated data items, in response to the instructions by using the at least one data item extracted from at least one of the instruction sets to perform the operation specified by the operation code and replacing the data items with a result of the operation;
    an airlink interface configured to receive the instruction sets;
    a file system section of nonvolatile permanent memory receiving patch manager run time instructions (PMR-TIs) via the airlink interface, the patch manager run time instructions including instructions and new code sections; and
    wherein the executable system software and system data are updated in response to processing the instruction sets.

36. In a wireless communications device, a method for updating data, the method comprising:
    executing system software;
    receiving an instruction set having instructions and data items from an air interface, at least one of the instructions including an operation code that specifies an operation to be performed using at least one data item extracted from the instruction set;
    launching a run-time engine;
    processing the instruction set;
    using conditional logic from the instruction set to identify a first data item to update in a code section, the code section comprising a symbol library having symbols of related functionality;
    using conditional logic from the instruction set to identify a second data item to not update in the code section;
    using the instruction set for replacing the first data item in the code section with updated data items, in response to the instructions by using the at least one data item extracted from the instruction set to perform the operation specified by the operation code and replacing the first data items with a result of the operation while leaving the second data item unchanged.

37. The method of claim 1, wherein performing the operation specified by the operation code comprises:
    comparing the extracted at least one data item to a first predetermined value;
    if the extracted at least one data item is less than the first predetermined value, then the extracted at least one data item is set as the result of the operation; and
    if the extracted at least one data item is greater than the first predetermined value, then the extracted at least one data item is replaced with the first predetermined value as the result of the operation.

38. The method of claim 37, further comprising:
    adding a second predetermined value to the extracted at least one data item before comparing the extracted at least one data item to the first predetermined value.

39. The system of claim 20, wherein the processor is further configured to:
    perform the operation specified by the operation code by comparing the extracted at least one data item to a first predetermined value;
    set the extracted at least one data item as the result of the operation if the extracted at least one data item is less than the first predetermined value; and replace the extracted at least one data item with the first predetermined value as the result of the operation if the extracted at least one data item is greater than the first predetermined value.

40. The system of claim 39, wherein the processor is further configured to:

add a second predetermined value to the extracted at least one data item before comparing the extracted at least one data item to the first predetermined value.

* * * * *